(12) United States Patent
Sarkis

(10) Patent No.: US 9,018,582 B2
(45) Date of Patent: Apr. 28, 2015

(54) PASSIVE RADIOMETRIC IMAGING DEVICE AND METHOD

(75) Inventor: Michel Sarkis, Stuttgart (DE)

(73) Assignee: Sony Corporation, Tokyo (JP)

( * ) Notice: Subject to any disclaimer, the term of this patent is extended or adjusted under 35 U.S.C. 154(b) by 559 days.

(21) Appl. No.: 13/343,507

(22) Filed: Jan. 4, 2012

(65) Prior Publication Data

US 2012/0188118 A1 Jul. 26, 2012

(30) Foreign Application Priority Data

Jan. 11, 2011 (EP) .................................... 11150617

(51) Int. Cl.
| | | |
|---|---|---|
| *G01J 1/00* | (2006.01) | |
| *G01T 1/00* | (2006.01) | |
| *G08B 13/189* | (2006.01) | |
| *H04N 5/33* | (2006.01) | |
| *G08B 13/194* | (2006.01) | |
| *G06T 5/00* | (2006.01) | |

(52) U.S. Cl.
CPC ................ *H04N 5/33* (2013.01); *G08B 13/189* (2013.01); *G08B 13/194* (2013.01); *G06T 5/002* (2013.01)

(58) Field of Classification Search
CPC .............................. G06T 5/002; G08B 13/189
USPC ............................................. 250/336.1, 250
See application file for complete search history.

(56) References Cited

U.S. PATENT DOCUMENTS

| | | | | |
|---|---|---|---|---|
| 3,916,193 | A * | 10/1975 | Corte et al. ................ | 250/336.1 |
| 6,636,645 | B1 | 10/2003 | Yu et al. | |
| 7,265,784 | B1 * | 9/2007 | Frank ............................. | 348/241 |
| 7,728,757 | B2 | 6/2010 | Cho | |
| 2006/0006322 | A1 * | 1/2006 | Vaidya ........................ | 250/252.1 |
| 2007/0122028 | A1 * | 5/2007 | Sun et al. ...................... | 382/154 |

(Continued)

FOREIGN PATENT DOCUMENTS

| | | |
|---|---|---|
| EP | 1 168 824 A2 | 1/2002 |
| EP | 1 168 824 A3 | 1/2002 |
| EP | 2 355 040 A2 | 8/2011 |

OTHER PUBLICATIONS

Yutaka Ohtake et al., "An Integrating Approach to Meshing Scattered Point Data", ACM Symposium on Solid and Physical Modeling, Jun. 2005, 9 Pages.

(Continued)

*Primary Examiner* — David Porta
*Assistant Examiner* — Jeremy S Valentiner
(74) *Attorney, Agent, or Firm* — Oblon, McClelland, Maier & Neustadt, L.L.P.

(57) ABSTRACT

A passive radiometric imaging device and a corresponding method for scanning a scene and reconstructing an image of said scene provide an improved image quality. The device comprises a radiometer for detecting radiation and a processing means for subsequently determining pixel values of pixels of the image to be reconstructed. A cost calculation unit calculates costs for the radiation samples of said data sub-set according to a predetermined cost function, said costs indicating the level of noise in the respective radiation sample. An optimization unit determines a pixel value as a label value from a set of label values, a label indicating a radiation sample or a group of radiation samples of the respective data sub-set, by determining an extremum of energy values determined for different radiation samples or different groups of radiation samples of the respective data sub-set by use of an energy function.

21 Claims, 14 Drawing Sheets

(56) References Cited

U.S. PATENT DOCUMENTS

| | | | |
|---|---|---|---|
| 2007/0221847 A1 | 9/2007 | Lettington et al. | |
| 2009/0060332 A1* | 3/2009 | Knapp | 382/173 |
| 2010/0027876 A1* | 2/2010 | Avidan et al. | 382/162 |
| 2010/0155587 A1 | 6/2010 | Nikittin | |
| 2011/0019935 A1* | 1/2011 | Kelm et al. | 382/275 |
| 2011/0122226 A1* | 5/2011 | Kamen et al. | 348/43 |
| 2011/0181461 A1 | 7/2011 | Sarkis | |

OTHER PUBLICATIONS

Leonid I. Rudin et al., "Nonlinear Total Variation Based Noise Removal Algorithms", Physica D. vol. 60, 1992, pp. 259-268.

Florian Luisier et al., "A new SURE Approach to Image Denoising: Interscale Orthonormal Wavelet Thresholding", IEEE Transactions on Image Processing, vol. 16, No. 3, Mar. 2007, pp. 593-606.

Antoni Buades et al., "A Non-Local Algorithm for Image Denoising", IEEE Conference on Computer Vision and Pattern Recognition, Jun. 2005, 6 Pages.

Sylvain Paris et al., "A Fast Approximation of the Bilateral Filter using a Signal Processing Approach", European Conference on Computer Vision, May 2006, pp. 1-12.

Joachim Weickert et al., "A Scheme for Coherence-Enhancing Diffusion Filtering with Optimized Rotation Invariance", Journal of Visual Communication and Image Representation, vol. 13, 2002, pp. 103-118.

Federico Tombari et al., "Classification and Evaluation of Cost Aggregation Methods for Stereo Correspondence", IEEE Conference on Computer Vision and Pattern Recognition, Jun. 2008, 8 Pages.

Oliver Schall et al., "Sparse Meshing of Uncertain and Noisy Surface Scattered Data", Technical Report, Max-Planck-Institut Für Informatik, Feb. 2005, 23 Pages.

Carlos Wai Yin Leung, "Efficient Methods for 3D Reconstruction from Multiple Images", Chapter 4, pp. 80-134, PhD Thesis, University of Queensland, Feb. 2006, 263 Pages.

R. K. Beatson, "Multiquadric B-splines", Journal of Approximation theory, vol. 87, Article No. 0089, Oct. 1996, pp. 1-24.

Yuichi Ohta et al., "Stereo by Intra- and Inter-Scanline Search Using Dynamic Programming", IEEE Transactions on Pattern Analysis and Machine Intelligence, vol. PAMI-7, No. 2, Mar. 1985, pp. 139-154.

Stephen Boyd et al., "Convex Optimization", Cambridge University Press, 2009, 730 Pages.

Jonathan S. Yedidia et al., "Understanding Belief Propagation and Its Generalization", Technical report, Mitsubishi Electric Research Laboratories, Jan. 2002, 35 Pages.

Yuri Boykov et al., "Fast Approximate Energy Minimization via Graph Cuts", IEEE Transactions on Pattern Analysis and Machine Intelligence, vol. 23, No. 11, Nov. 2001, pp. 1222-1239.

Extended European Search Report issued Jul. 13, 2012 in Patent Application No. 12150129.0.

D. Shen et al., "Markov Random Field Regularisation Models for Adaptive Binarisation of Nonuniform Images", IEE Proceedings: Vision, Image and Signal Processing, Institution of Electrical Engineers, vol. 145, XP006011584, Oct. 21, 1998, pp. 322-332.

Wesley Snyder, "Image Relaxation: Restoration and Feature Extraction", IEEE Transactions on Pattern Analysis and Machine Intelligence, vol. 17, No. 6, Jun. 1995, pp. 620-624.

HongJun Li et al., "Infrared Image Denoising Algorithm Based on Adaptive Threshold NSCT", Image and Signal Processing, XP031286890, May 27, 2008, pp. 353-357.

* cited by examiner

Bilateral Filtering

Anisotropic Diffusion

PASSIVE RADIOMETRIC IMAGING DEVICE AND METHOD

CROSS-REFERENCE TO RELATED APPLICATIONS

The present application claims priority of European patent application 11150617.6 filed on Jan. 11, 2011.

FIELD OF THE INVENTION

The present invention relates to a passive radiometric imaging device and a corresponding method for scanning a scene and reconstructing an image of said scene. Further, the present invention relates to a processing apparatus and a corresponding processing method for use in a passive radiometric imaging device. Still further, the present invention relates to a computer readable medium.

BACKGROUND OF THE INVENTION

Electromagnetic waves are classified into several types depending on the wave frequency. These waves have been applied to a lot of applications like in-vehicle radar devices for measuring the distance between moving vehicles in order to prevent collisions, in concealed weapon detection, or in detecting malignant cells. Further, improved generation and detection techniques as well as latest improvements in the integration and miniaturization of devices operating at various frequency ranges have created a lot of interest to exploit the properties of this electromagnetic radiation. Examples are milli-meter and sub-millimeter waves (30 GHz to a few THz) which have the ability to penetrate non-metal materials, including plastics, walls, clothes, smoke and fog.

Electromagnetic waves can be used in an active or a passive mode. A passive radiometric imaging system creates images by capturing the electromagnetic radiation emitted by the objects by using a radiometer. Such a passive radiometric imaging system is, for instance, known from US 2007/0221847 A1.

Passive electromagnetic waves are emitted naturally by any object. The strengths of these waves depend on the object itself. These signals are, however, weak and are degraded fast due to both the internal noise factors of the radiometer and the external noise factors of the environment. Therefore, the radiation samples of the passive electromagnetic waves captured by the radiometer are generally degraded by high noise variations.

Conventionally, in passive radiometric imaging devices it is tried to employ image de-noising and enhancement algorithms to reduce the effect of the noisy images obtained from the sensor (i.e. the radiometer). Such de-noising or enhancement algorithms can be based on image wavelets, on the Total Variation principle, on manifold learning algorithms, on filtering schemes like wiener or bilateral filtering, on diffusion algorithms or on image pyramids in combination with extrapolation in the frequency space. Many other techniques exist as a state of the art. However, all of these algorithms are mainly designed as a post-processing step of the noisy radiometer image. In other words, such algorithms do not directly process the radiometric samples when recovering the radiometer image, but they enhance, improve or de-noise an integrated image from all the samples of the radiometer by using an algorithm like one of the just mentioned algorithms.

Further, these techniques can suppress the noise to some extent but the resulting image will suffer from a lot of fluctuations due to the high variation of noise and interference at the sensor, especially in passive radiometers, in which the signal to noise ratio is low.

As a result, the obtained image after reconstruction will be degraded. This will make the applications of the passive radiometric imaging device for object detection in security screening applications a difficult task. This is mainly due to the degraded nature of the image that can result either in false alarms or in some suspicious objects being missed from the screening.

BRIEF SUMMARY OF THE INVENTION

It is an object of the present invention to provide a passive radiometric imaging device and a corresponding method for imaging a scene providing a better image quality compared to known passive radiometric imaging devices and methods.

It is a further object of the present invention to provide a processing apparatus and a corresponding processing method for use in a passive radiometric imaging device, as well as to provide a corresponding computer readable medium.

According to an aspect of the present invention there is provided a passive radiometric imaging device for scanning a scene and reconstructing an image of said scene, said device comprising:
a radiometer configured to detect radiation emitted in a predetermined spectral range from
a plurality of spots of said scene to obtain a data set of radiation samples including at least one radiation sample per spot, and
a processing means configured to subsequently determine pixel values of pixels of the image to be reconstructed, said processing means being adapted to determine a pixel value of one of said pixels from a data sub-set of radiation samples from said data set, said data sub-set including the radiation samples detected at the spot corresponding to or being closest to the pixel, whose pixel value is to be determined, and/or radiation samples detected at neighboring spots, said processing means comprising
a cost calculation unit configured to calculate costs for the radiation samples of said data sub-set according to a predetermined cost function, said costs indicating the level of noise in the respective radiation sample, and
an optimization unit configured to determine a pixel value as a label value from several label values, a label indicating a radiation sample or a group of radiation samples of the respective data sub-set, by determining an extremum of energy values determined for different radiation samples or different groups of radiation samples of the respective data sub-set by use of an energy function, said energy function forming a sum adding a first summand including the costs of the radiation sample or group of radiation samples, for which the energy value is determined, and a second summand taking account of the costs of at least one radiation sample or group of radiation samples of at least one neighboring data sub-set.

According to further aspects of the present invention there are provided a processing apparatus for use in a passive radiometric imaging device, a corresponding passive radiometric imaging method and a corresponding processing method.

According to still a further aspect of the present invention there is provided a computer readable non-transitory medium having instructions stored thereon which, when carried out on a computer, cause the computer to perform the steps of the processing method proposed according to the present invention.

Preferred embodiments of the invention are defined in the dependent claims. It shall be understood that the claimed processing apparatus, processing method, passive radiometric imaging method and the claimed computer program have similar and/or identical preferred embodiments as the claimed passive radiometric imaging device and as defined in the dependent claims.

The present invention is based on the idea to take account of the favorable property of a radiometric surface which is generally a piece-wise smooth surface. The variation of the surface within an object in the image is smooth. The jumps and the high variations happen at the edges of the scene captured by the radiometer. Hence, according to the present invention all the radiation samples detected by the radiometer are taken into account depending on the sampling rate and the objective image resolution. Further, according to the present invention the properties of the radiometric surface are taken into account when calculating the pixel values of the pixels of the image. Said pixel values may then directly form the image or may be further processed for reconstructing the image, which, preferably, is simultaneously de-noised or enhanced.

Further, according to the present invention an optimization technique designated for radiometric image reconstruction is applied. Starting from the above explained general idea an optimization algorithm is provided, which can, for instance, be considered as a labeling problem, choosing a label value for each pixel of the image out of several label values. The invention includes deriving the necessary cost functions needed to reconstruct the radiometric images from the raw radiation samples of the radiometer. Further, an energy function is established to be used by the optimization for determining energy values associated with all the label values, from which an extremum (in particular a minimum or maximum) is searched. Said extremum corresponds to the sought label for each pixel or the reconstructed radiometric image. In the sum formed by said energy function two terms are added, in particular a first summand including the costs of the radiation sample or group of radiation samples (being assigned with a label), for which the energy value is determined, and a second summand taking account of the costs of at least one radiation sample or group of radiation samples (being assigned with a label) of at least one neighboring data sub-set.

In preferred embodiments the optimization can be done locally, per column and/or row (i.e. per scanline) or globally, i.e. it can be controlled if and of how many neighboring data sub-sets the costs of radiation samples or groups of radiation samples are taken into account when calculating the energy value for each label by use of the energy function. Further, various embodiments exist for determining the energy values for all labels and the extremum of all energy values corresponding to the reconstructed image. Preferred embodiments use belief propagation or dynamic programming.

BRIEF DESCRIPTION OF THE DRAWINGS

These and other aspects of the present invention will be apparent from and explained in more detail below with reference to the embodiments described hereinafter. In the following drawings

DETAILED DESCRIPTION OF THE INVENTION

Figure 1:
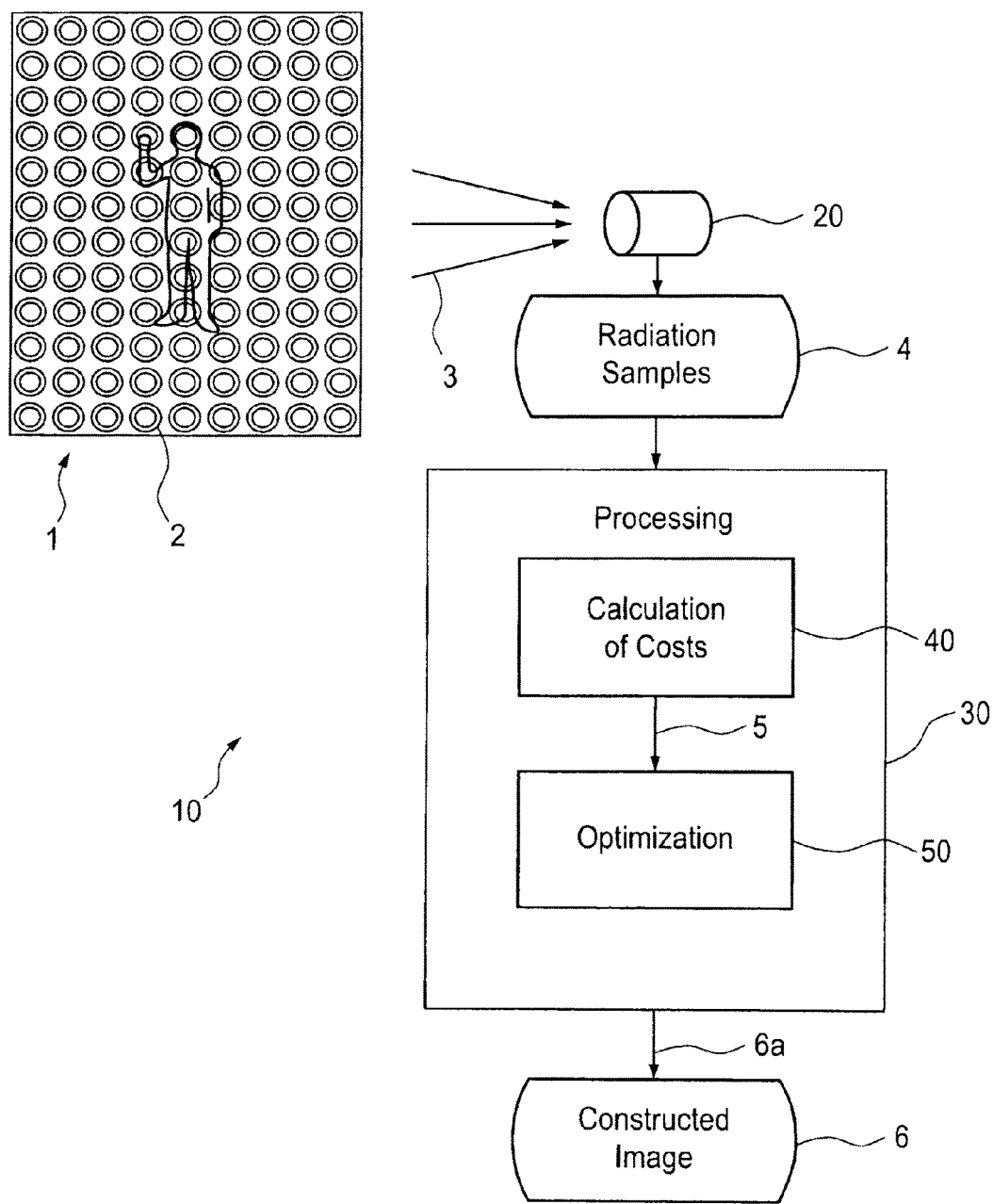
FIG. 1 shows a first embodiment of a passive radiometric imaging device according to the present invention.

In the following, details and different embodiments of the invention are explained. FIG. 1 shows a block diagram of the general layout of the passive radiometric imaging device 10 according to the present invention. The electromagnetic waves can generally be in any range (microwave, millimeter, sub-millimeter or other spectral ranges) emitted from a scene, e.g. a person standing in front of a wall, are captured by a radiometer 20. Generally, by the radiometer 20 radiation 3 emitted from a plurality of spots 2 of said scene 1 is acquired to obtain a data set of radiation samples 4 including at least one radiation sample per spot 2.

Generally, the radiometer 20 comprises a single radiometer unit by which the scene is scanned spot by spot. Thus, depending on the integration time of the radiometer unit, from each spot one or more radiation samples are obtained. For scanning over the scene 1 the radiometer 20, or at least its antenna, is mechanically moved along a predetermined trajectory, e.g. in a meandering scheme, over the scene 1. In other embodiments, the sensitivity profile of the radiometer can be electronically moved over the scene 1. In further embodiments, sensing the scene 1 is done by placing a static or a moving reflector next to the radiometer 20. The radiometer 20 may also comprise two or more radiometer units, which can simultaneously detect radiation from two or more radiation spots so that scanning time can be decreased. These and other embodiments of a passive radiometer 20 are generally known and will thus not be explained in more detail in this application.

Generally, pixels of the image to be reconstructed should coincide with the spots 2, at which the radiation samples 4 have been acquired, so that a data sub-set comprises the radiation samples detected at the spot, which coincides with the pixel, and the radiation samples of neighboring spots. In practical implementations this condition is not always completely satisfied, thus creating a noisy image if the samples are simply integrated. This also proofs that there is a need for a solution as proposed by the invention to compensate for this disadvantage.

Therefore, the data set of radiation samples 4, which may be stored in a storage unit (not shown), is processed by a processing unit 30 for subsequently determining their contribution to the reconstruction of each of the pixel values 6a of pixels of the image to be reconstructed. It shall be noted that the determination of the pixel values 6a can be done serially, in parallel, or in a mixed structure.

The determined pixel values 6a either directly represent the pixels of the image, which can thus be, for instance, displayed on a monitor. Alternatively or in addition, a post-processing of the determined pixel values 6a may optionally be performed, e.g. using image processing tools such as interpolation or de-blurring.

Thus, the constructed image 6 may simply be a depiction of the determined pixel values of all the pixels. However, other embodiments for post-processing the determined pixel values and/or the image are possible, and it is, for instance, also possible to generate an image from more or less pixel, wherein more pixels may be generated by known interpolation of available pixel values 6a and wherein less pixels may be generated by combination and/or averaging of pixel values 6a generated by the processing unit 30.

Since, as mentioned above, according to the present invention the properties of the radiometric surfaces are taken into account when reconstructing the image and since directly the (raw) radiation samples are processed and not the integrated image, the obtained images have a better quality than images obtained with conventional passive radiometric imaging devices and methods. In particular, the images have more contrast, less noise and the shapes of the objects are much more preserved and less varying. This allows a better post-analysis of the radiometric image for various applications, e.g. security applications for weapon detection at an airport.

According to the present invention the processing unit 30 is configured to subsequently determine pixel values of pixels of the image to be reconstructed, wherein a pixel value of one of said pixels is determined from a data sub-set of radiation samples from said data set, said data sub-set including the radiation samples detected at the spot corresponding to or being closest to the pixel, whose pixel value is to be determined, and/or radiation samples detected at neighboring spots. For this purpose the processing unit 30 comprises a cost calculation unit 40 configured to calculate costs 5 for the radiation samples of said data sub-set according to a predetermined cost function, said costs indicating the level of noise in (also referred to as the degree of noisiness of) the respective radiation sample. Further, the processing unit 30 comprises an optimization unit 50 that receives the determined costs 5 and is configured to determine a pixel value 6a by finding a label value out of several label values. Here, a label value is indicating a radiation sample or a group of radiation samples, e.g. indicating the number of the radiation sample or the number of the group of radiation samples within a data sub-set. The label value and hence the reconstructed value of the pixel is obtained by determining an extremum of energy or cost values corresponding to the label values of the different radiation samples or different groups of radiation samples of the respective data sub-set using an energy function, said energy function forming a sum adding a first summand including the costs of the radiation sample or group of radiation samples, for which the energy value is determined, and a second summand taking account of the costs of at least one radiation sample or group of radiation samples of at least one neighboring data sub-set.

Figure 2:
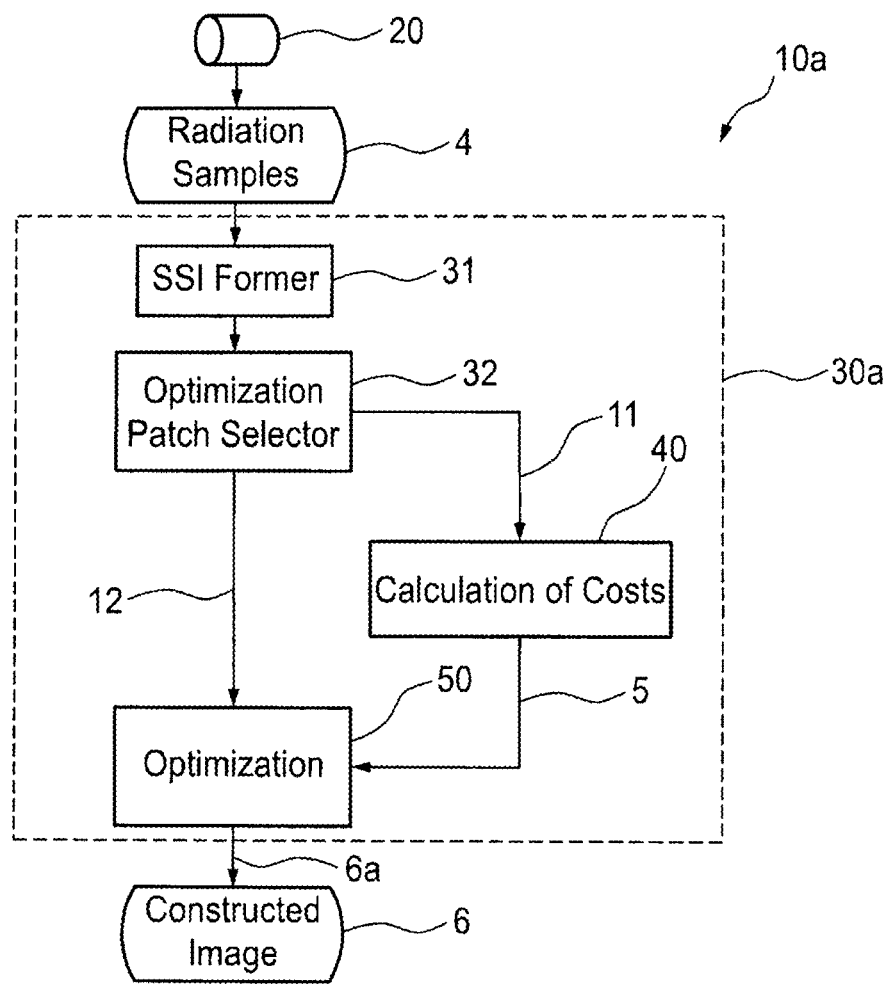
FIG. 2 shows a second embodiment of a passive radiometric imaging device according to the present invention.

A first embodiment of a passive radiometric imaging device 10a according to the present invention is shown in FIG. 2 comprising a first embodiment of a processing unit 30a. In this embodiment, the radiation samples 4 of the scene 1 are stored in the samples storage of the radiometric imaging device. The stored samples of the radiometer are preferred to be standardized in the sense that they are centered and normalized by the standard deviation. The standardization (or normalization), sometimes referred to as whitening, is not generally required according to the invention, but is a preferred pre-processing step to stabilize the numerical computations of the image reconstruction from the radiometer 20 since it creates the possibility to filter out some noise. The standardization usually retains the number of samples obtained from the radiometer and it is a reversible operation. It simply centers and normalizes the values of these samples to create numerical stability. Unlike the integration process of the samples which results in one value for each pixel, the original values of the samples after standardization can be recovered back from the mean and the standard deviation.

Figure 3:
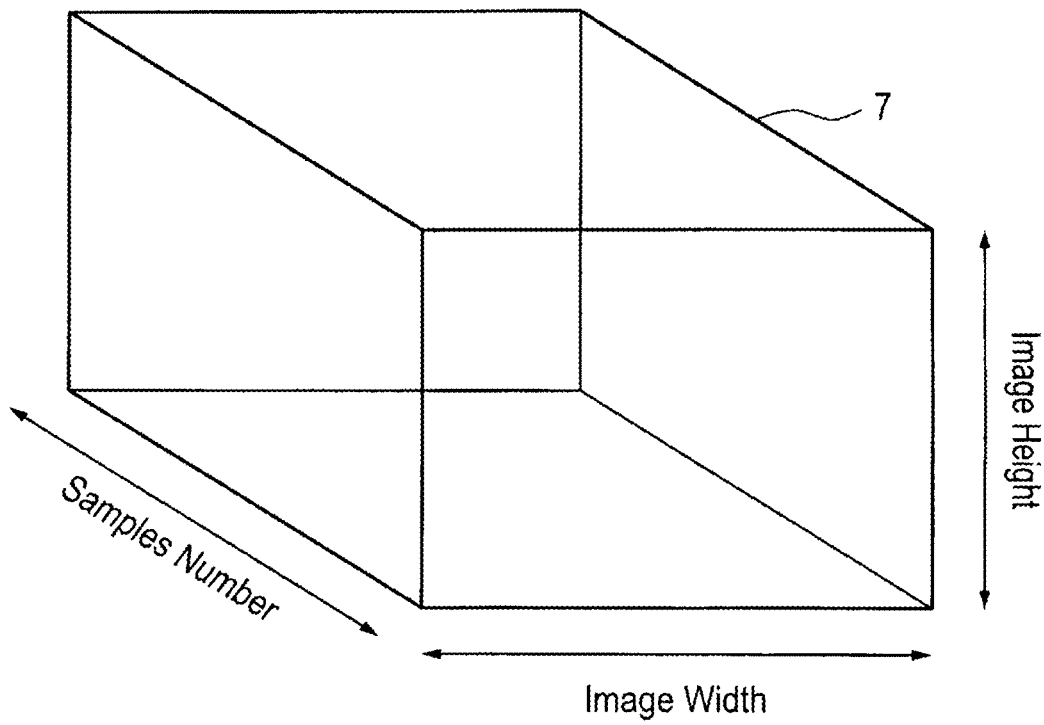
FIG. 3 shows a three-dimensional sample space image formed from the obtained radiation samples.

Then, depending on the image resolution to be reconstructed and the sampling rate of the radiometer 20, the radiation samples 4 are mapped into a sample space image (SSI) using a SSI former 31. An example SSI 7 is shown in FIG. 3. Here in this embodiment the SSI 7 is a three-dimensional (3D) space (or data set) which has the dimensions of the width and the height of the output image and the number of radiation samples of each pixel. In case each pixel has only one sample, the SSI will become of two-dimensions (2D), i.e. a two-dimensional data set. In case more than one radiometer units are used for acquisition of the radiation samples 4, the SSI 7 can also be extended to more than 3D to accommodate the multiple sensors (radiometer units) jointly and/or to other factors like time. For simplicity, in the following, the case of having a single radiometer unit and having multiple samples per pixel will be explained as an example but is not designated to limit the scope of this invention.

Once the SSI 7 is formed, the aim of the next processing steps becomes finding the piece-wise smooth curve (which can also be regarded as an image) within the radiation samples of the SSI 7 that best describes the scene under consideration from all the radiation samples 4 in the SSI 7. Thereby, it is kept in mind, however, that the radio-metric scene 1 is a piece-wise smooth surface. This is justified since the radiation emitted from any real-life object has smooth variations within the geometric edges. The abrupt jumps or discontinuities can generally only be found at the edges of the object; therefore, each piece (surface) is smooth and this is why it is designated by a piecewise-smooth surface. Therefore, in order to construct or reconstruct (both terms are interchangeably used throughout this application, and using one these terms shall not be understood such that the meaning of the other term is excluded) the image according to the present invention, this constraint will be taken into account in the reconstruction process, which is one of the elements, by which the invention distinguishes from the known methods. Preferred embodiments of the invention additionally take the corresponding samples of the pixel under consideration along with the samples of other pixels inside the SSI into account as will be explained below.

To reconstruct a pixel of the radiometric image, an optimization algorithm is used to choose a label for each pixel from a set of label values. For that, costs are computed for each label using the corresponding samples of the pixel in the SSI 7 under consideration, i.e. all the samples obtained at the spot, whose position corresponds to the position of the pixel or is closest to the position of the pixel as one preferred embodiment. Depending on the type of the optimization algorithm used, i.e. local, scanline or global (which will be explained below in more detail), it might be necessary to also use the samples of the neighboring spots (pixels) when computing the costs. Therefore, it is preferred according to embodiments of the present invention to take the samples of the pixel to be reconstructed and the neighboring samples into account when reconstructing the pixel value with local or scanline based optimization algorithms. Thus, a patch selector 32 is provided for assigning a patch 8 for each pixel, when the costs of the pixel assuming different label values is to be computed. In one preferred embodiment, the patch can be the samples of the pixels itself when using a global optimization algorithm to reconstruct the image. In another preferred embodiment, the patch includes the samples of the pixel where the costs are computed along with all the neighboring samples in the SSI 7. Such a patch 8 can be regarded as a data sub-set of the (complete) data set represented by the SSI 7.

For simplicity of the explanation two cases will be referred to in the following, in particular a first case when the samples of the pixel itself are used for cost computations and the optimization is done with a global algorithm, and a second case, when the optimization algorithm used is scanline or local-based and the samples of the pixel and those of its neighbors are used to compute the costs. The first case is simple since the patch consists of the samples of the pixel itself. In the second case, the patch should contain the neighboring samples and will be explained next. It should be noted, however, that an expert in the field can apply other combinations according to the present invention depending on the optimization algorithm applied.

Figure 4:
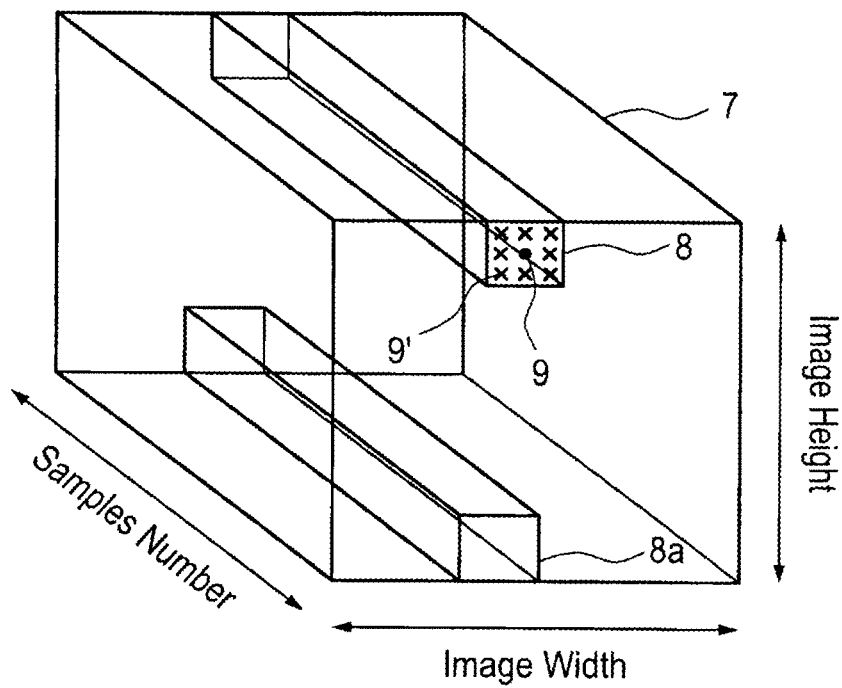
FIG. 4 shows a first embodiment of patches formed in the sample space image.

In the simplest embodiment, the patch around each pixel can be uniform in size by using a pre-defined fix-window size. An example of such a patch 8 is shown in FIG. 4. In this embodiment the patch 8 around each pixel will have the form of a cuboid in the 3D space that contains all the samples of the pixel 9 itself (indicated by a dot) and those of the neighboring pixels 9' (indicated by a cross). In case there is only a single radiation sample per pixel, the cuboid reduces to a square window.

Figure 5:
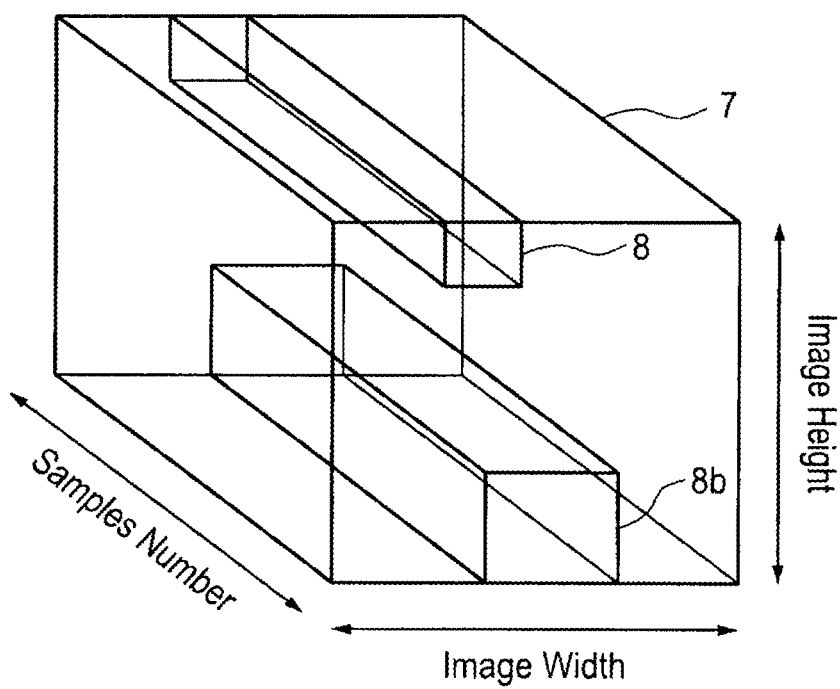
FIG. 5 shows a second embodiment of patches selected in the sample space image.

Further, in the embodiment shown in FIG. 4 the size of the cuboid 8 is the same across all the pixels as shown by the two exemplary cuboids 8 and 8a. In another embodiment, as shown in FIG. 5, the size of the patch, in particular its cross section in a plane parallel to the plane spanned by the image width and image height varies depending on the location of the pixel under consideration in the SSI as shown two the exemplary cuboids 8 and 8b. In this case the dimensions of the cube differ depending on the location of the pixel, and the form of the patch may also vary from a cuboid, depending on the algorithm used for computing the significant neighbors of the pixel under consideration.

In the previous case, the patch selector 32 then computes the neighbors around each pixel. These neighbors can be referred to also as the optimal neighbors that mostly corresponds to the pixel itself or the segment to which it belongs. In other words, optimal neighbors are considered to be neighbors that the samples of the pixel values are as close together as possible. Example algorithms that can be used for this purpose are variable windows, segment support or similar techniques. In the first one, windows of several sizes and shapes are defined around each pixel. The window that best describes the region around the pixel is then chosen as the patch. In the second one, the SSI is segmented or clustered into several regions. Then, the segment to which the pixel belongs is chosen as the patch. More details about these two algorithms and a summary of schemes that can be applied to determine an optimal patch 8 in the SSI 7 can be found, for example, in F. Tombari, S. Mattoccia, and L. Di Stefano, "Classification and evaluation of cost aggregation methods for stereo correspondence", IEEE Conference on Computer Vision and Pattern Recognition, pp. 1-8, June 2008. It should, however, be noted that these algorithms are not the only ones that can be used to determine the adaptive or optimal patch of each pixel.

The aim of the present invention is to reconstruct, using an optimization algorithm, an image from the raw samples of the radiometer by assuming it as a piece-wise smooth surface. This is done by finding a label from a set of labels for each pixel. Hence, the costs are calculated by the cost calculation unit 40 needed for the optimization by the optimization unit 50 should reflect this property. In addition, the optimization should be able to find its solution by locating the optimal point in the costs corresponding to the optimal label for each pixel. Depending on the costs used for the optimization, the optimal point is defined to be the location where the cost values associated with the labels have an extremum, i.e. a minimum or a maximum. Therefore, any type of costs that satisfies these properties can be used for the optimization according to the present invention.

To calculate the costs, according to an embodiment two criteria should preferably be fulfilled. First, at least one reference or representative point should be calculated for each pixel that should be reconstructed. Second, the distances of the samples to the one or more reference points should be estimated.

Figure 6:
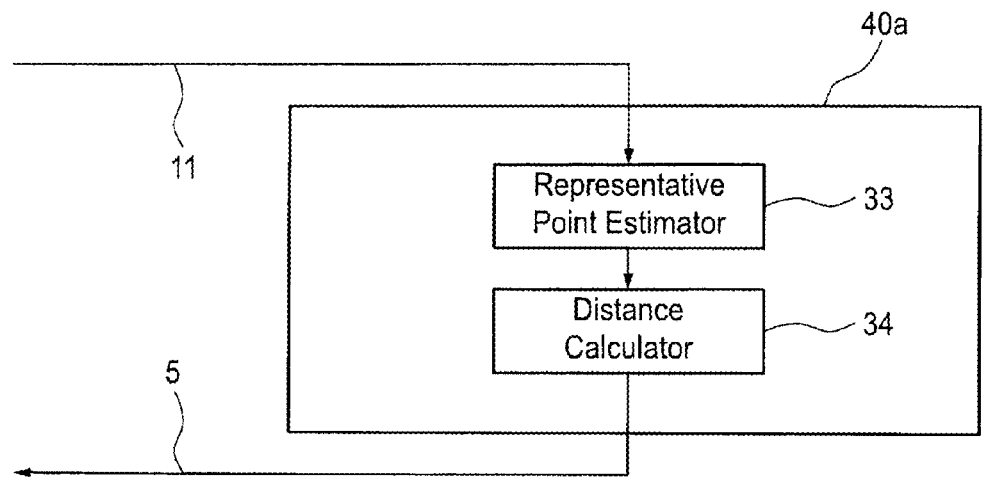
FIG. 6 shows first embodiment of a cost calculation unit according to the present invention.

Using patches, it is possible to reduce the noise effect (especially when using local or scanline based optimization algorithms) since the cost value of a label that a pixel can have in the optimization will be computed in correspondence with its neighboring pixels. As shown in FIG. 4, once the patch 8 for the pixel to be computed is assigned, at least one representative point is determined for all the samples in the patch 8 by a representative point estimator 33 shown in FIG. 6 depicting a first embodiment of a cost calculation unit 40a. Each representative point is a reference point which is used to compute the distance to each sample when computing the cost values for the optimization. In the following, the description of the invention will be limited to one representative point. The accommodation of more than one representative point is, however, also possible according to the invention.

Let $X_i$ be the value of a sample in the patch 8, let N be the number of the overall samples in the patch 8 and let R be the value of the representative point. In this preferred embodiment of the invention, the value of one representative point R is the magnitude of the centroid. It is given by $$R = \left| \frac{1}{N} \sum_{i=1}^{N} X_i \right|. \tag{1}$$

Taking the magnitude of the centroid of the patch 8 is the preferred embodiment of the invention since it is simple and fast. In other embodiments of the invention, as will be explained below, the data can be transformed and will have complex values. In case no such transformations are done to the data, the value of the centroid can be used as an alternative embodiment. It is also possible to use as different embodiments the median or its magnitude; however, the magnitude of the centroid gives an improved performance over them and is the preferred embodiment. It is also possible to apply other methods as alternative embodiments to calculate a representative point of the patch. One alternative embodiment is to take cluster the data in the SSI as generally described in O. Schall, A. Belyaev, and H. P. Seidel, "Sparse meshing of uncertain and noisy surface scattered data," Technical Report, Max—Planck—Institut Für Informatik, February 2005. Other alternative embodiment uses the center of the sphere that contains the most of the points of the patch in the SSI as generally described in Y. Ohtake, A. Belyaev, and H. P. Seidel, "An integrating approach to meshing scattered point data," in ACM Symposium on Solid and Physical Modelling, pp. 61-69, June 2005. However, these embodiments are not the only ones that can be used to calculate the representative point of each patch, but any algorithm with the goal to find a reference point of the patch can generally be applied.

Once at least one representative point from the samples used to compute the costs for each pixel is computed, the cost calculation unit 40a will use it to compute its distances to each of the samples. These distances can be actually the costs that can be used in the subsequent optimization. Therefore, in a preferred embodiment of the invention, the calculation of costs block is actually composed of a reference or a representative point estimator 33 and a distance calculator 34 as shown in FIG. 6.

In an embodiment each representative point will be used by an distance calculator 34 to determine the distances to the samples. The distance $d_i$ of any point $X_i$ in the SSI 7 to the representative point R is given by $$d_i = |R - X_i|. \quad (2)$$

The distance can also be defined by the squared difference between R and $X_i$, as in $(R-X_i)^2$. Other equivalent similarity measures can be also be applied. Since the samples are noisy and varying, it is better to regularize the distances so as to prevent extreme values that can bias the computations. An example preferred embodiment is to use the truncated version of the distance $\hat{d}_i$ to enhance the quality of the reconstructed image. By using this preferred embodiment, extreme values of the distances can be cut off. The truncated distance is given by $$\hat{d}_i = \min(d_i, c), \quad (3)$$

where c is a real constant representing the truncation value. Typical values of c are in the range between 0 and 20 if the data of the radiometer is standardized. Otherwise, the value of c can be adapted depending on the samples output of the radiometer. The truncation value can be preset across the whole patches 8 of the SSI 7 or computed adaptively depending on the statistics of the SSI 7 or the patch 8 itself; one example is the standard deviation. Other variations on how to compute c can also be used according to the invention.

The truncated distance presents the preferred embodiment of the invention, but other embodiments are also possible as long as they try to regularize the distances like the truncated distances do. One alternative embodiment is the Potts model which assigns two values for the distances depending if they are below or above a certain threshold similar to c. Another alternative embodiment is to assign three values of the distances depending on two threshold values of the distances $K_1$ and $K_2$, where $K_1 \leq K_2$. In other words, the distances will have a value $V_1$ if a distance is less than $K_1$, $V_2$ if it is between $K_1$ and $K_2$ and $V_3$ if the distance is larger than $K_2$. More details on these functions can be found in in C. Leung, "Efficient methods for 3D reconstruction from multiple images", Chapter 4, pp. 109-112, PhD thesis, University of Queensland, February 2006. It is to be noted again, however, that these alternative embodiments are not the only possible ones, but others can be used as long as they tend to regularize the distances.

Figure 7:
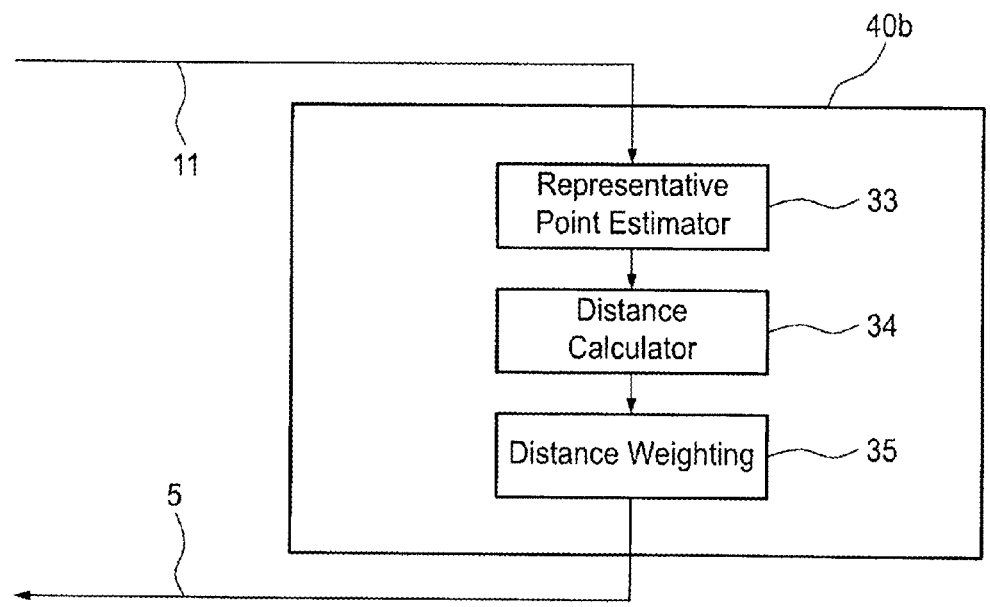
FIG. 7 shows second embodiment of a cost calculation unit according to the present invention.

As mentioned above the distances determined in distance determination unit 34 can be used as costs 5 by the optimization unit 40. However, it also possible to weight the calculated distance before using them in the optimization to reconstruct the image. Depending on the level of noise in the samples of the radiometer and the optimization algorithm used, weighting the distances might help in reaching a solution with less noise. Consequently, another preferred embodiment of the cost calculation unit 40b is shown in FIG. 7, according to which in addition to the representative point estimation unit 33 and the distance estimation unit 34 a weighing factor calculation unit 35 is provided.

In an embodiment the adaptive distances are now used to determine the weights that will be used to reconstruct the pixel value of the radiometric image by the weighing factor calculation unit 35. The weights that should be used according to this embodiment should preserve the smoothness and the structure of the radiometric image. In other words, it should ensure that the radiometric surface properties are taken into account in the reconstructed pixel values. In general, the weight for a radiation sample is determined based on its similarity to the representative point, in particular by assigning a higher weight with increasing similarity or a lower distance. Therefore, the weights in general should be defined as a function inversely proportional to the distances. The higher the distance is, the more the noise content is in the sample. Hence, the weight of sample in the reconstruction process should be smaller. In general, the weight of the sample should be defined as $$K_i = \frac{Q}{f(\hat{d})} \quad (3a)$$

where $K_i$ is the weight of the sample in the reconstruction process, Q can be a function of $\hat{d}$ or a scalar and $f(\hat{d})$ is a function of $\hat{d}$. It should be noted that this equation can be applied directly to the distances d as well if no regularization is done to the distances.

As one preferred embodiment, the general multiquadric spline smoothing kernel, as for instance described in R. K. Beatson and N. Dyn, "Multiquadric b-splines", Journal of Approximation Theory, pp. 1-24, October 1996, to reconstruct these weights. The multiquadric spline kernel will define the weights $K_1$ in equation (4). It is given at each sample $X_i$ of a patch as a function of the distance $d_i$ (or preferably its truncated version $\hat{d}_i$) by $$K_i = n \cdot A(n) \cdot l^{2n} \cdot \left(\hat{d}_i^2 + l^2\right)^{-\frac{2n+1}{2}}, \quad (4)$$

where l is a pre-defined real constant. Lower values of l will result in a smoother image while larger values of l will result in a noisier image. A typical value for l is between 0 and 2 if the data of the radiometer is standardized. However, other values can be used depending on the data output of the radiometer. Further, 2n is the order of the polynomial of the multiquadric spline, n being a positive integer. A typical value of n is in the range between 3 and 7. However, the value of n can be used depending on the data output of the radiometer. Higher values of n will lead to smoother surfaces and vice versa. A is the function defined by $$A(n) = \frac{(2n-1)!!}{2n!!} = \frac{1 \times 3 \times 5 \times \ldots \times (2n-1)}{2 \times 4 \times 6 \times \ldots \times (2n)}. \quad (5)$$

Other smoothing kernels can also be used according to the present invention as long as they take the properties of the radiometric surface into account, when reconstructing the image from the radiation samples. In addition, the embodiment should satisfy equation (3a). One alternative embodiment to the multiquadric splines is the kernel of the bilateral filter which is defined by applying two Gaussian filters to all of the samples of the patch in the SSI. Embodiments with other kernels can be used as long as they take the properties of the radiometric surface into account when reconstructing the image and satisfy equation (3a). Once the weights are computed, they are preferably normalized to obtain the costs 5 as an alternative embodiment to the distances. It is also possible according to embodiment of the present invention to convolve them with the computed distances in equation (2) or equation (3) to obtain the costs as another alternative embodiment to the distances and weights.

An essential aspect of the present invention is the optimization process to construct the radiometric image. The optimization can operate directly on the distances as shown in the embodiment of FIG. 6, on their weighted versions as shown in the embodiment of FIG. 7 or the weights themselves as costs. Irrespective of which costs are used, they will be denoted in the following by $C(\cdot)$. The aim of the optimization is to find the extremum of the calculated costs that correspond to the optimal radiometric image while preserving its properties at the same time, i.e. piecewise smooth surface.

The radiometric image can be thought of as a surface where each pixel has single associated value from all the possible label values. The aim of the optimization is to estimate the best sample label L at each pixel in the image that best describes the scene captured by the radiometer, where x is the row number of the pixel and y is its column number. The label L is the sample number in the SSI in one embodiment of the invention or, in another embodiment, refers to other labeling schemes which will be described below. Irrespective of the labeling scheme used, the label is defined to be the best label, hence the reconstructed pixel value of the radiometric image, if it is associated with an extremum in the computed costs and if it satisfies the properties of the radiometric image at the same time. This can be expressed mathematically as follows $$E(\Delta) = \sum_{x,y} C(x, y, L) + \lambda \sum_{x,y} \sum_{x_i, y_i} \psi(L, L_i), \quad (6)$$

where $\Delta$ is one possible solution radiometric image of equation (6) from all the possible solutions, $E(\Delta)$ is the energy function which corresponds to the possible image solution $\Delta$, $C(x, y, L)$ is the cost of a label using the methods explained above, $\psi(L, L_i)$ is a function that describes the relation between the label L at one pixel and the label of one of its neighbors $L_i$ and $\lambda$ is a weighting factor that regularizes the terms in $E(\Delta)$.

Hence, as shown in equation (6), according to the present invention an energy function is generally used forming a sum adding a first summand (the first term in equation (6)) including the costs of a pixel assuming the radiation sample or group of radiation samples, for which the energy value is determined, and a second summand (the second term in equation (6)) taking account of the costs of at least one radiation sample or group of radiation samples of at least one neighboring data sub-set.

The term to the left in equation (6) describes the cost of a pixel assuming a label value while the term to the right in equation (6) describes the interactions within the neighboring pixels. Therefore, the right term is the term that should enforce the properties of the radiometric surface according to the present invention when constructing the image and $\lambda$ is the term that weighs the costs of the samples with respect to the interaction with its neighbors.

The above equation is only a preferred embodiment of the present invention and several variations of this equation exist and can be easily derived by the skilled person. For example, it is possible to place $\lambda$ in front of the left term in equation (6) or it is possible to optimize equation (6) while considering only one of the above two terms or also by adding an extra term to the equation. It is, however, important to consider the radiometric surface properties in the optimization. $\lambda$ is typically chosen according to the present invention as a positive real number.

Now, the remaining three issues will be discussed to make the description of the invention complete: The labeling scheme that defines the number of labels L where $E(\Delta)$ should be optimized, the function $\psi(L, L_i)$ that describes the interaction between each pixel in the image with its neighbors and the optimization algorithm that can be used to reconstruct the radiometric image.

Figure 8:
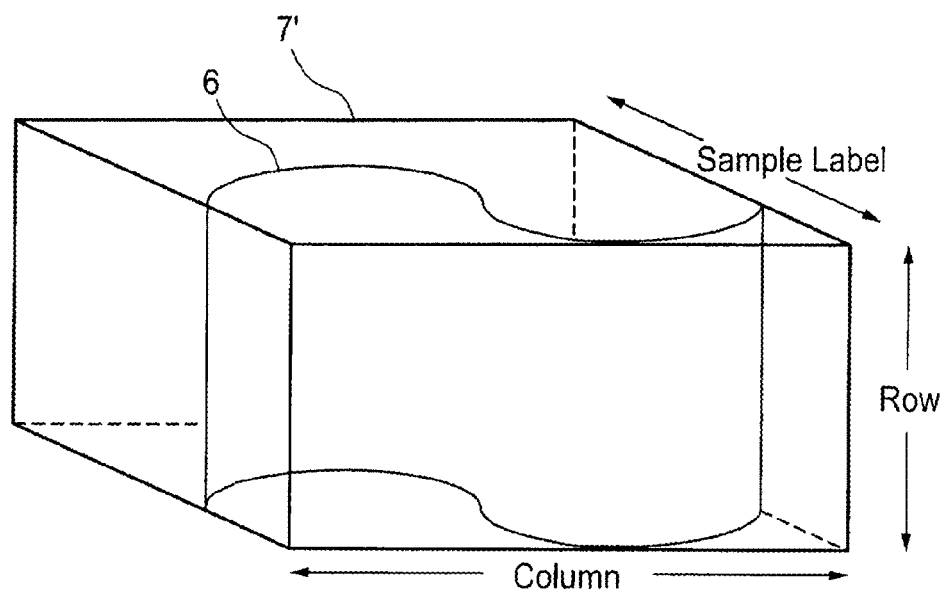
FIG. 8 shows a diagram illustrating a grouped sample space image and selected label values forming a radiometric image.

The labeling scheme describes where equation (6) should be optimized in order to construct the radiometric image 6 as shown in FIG. 8 showing a diagram illustrating a grouped sample space image (GSSI) 7' and selected pixel values forming the radio-metric image 6. In a simple embodiment the labeling scheme refers to the sample number in the SSI 7. In this case, the goal of the optimization algorithm is to find the best combination of labels or samples $\Delta$ in the computed costs according to equation (6).

In a preferred embodiment the samples of the radiometer are grouped into several groups. Let M, where 0<M<N and N is the total number of samples for each pixel, be the number of these groups. The optimization according to equation (6) will correspond in this case to finding the optimal label L for each pixel such that $0 \leq L \leq M$.

Figure 9:
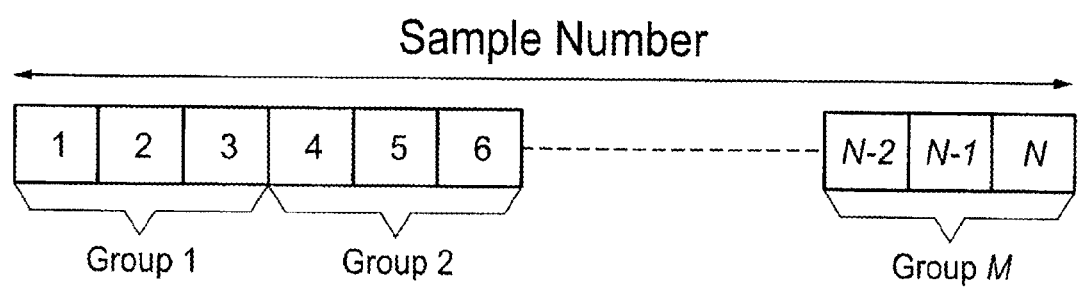
FIG. 9 shows a diagram illustrating the grouping of radiation samples.

The preferred embodiment for grouping the samples according to the present invention is to perform a uniform grouping the computed distances. The uniform grouping is a simple and efficient solution for the labeling problem. It consists of sub-dividing the computed distances into different bins according to the order of appearance and the number of groups required. An example is shown in FIG. 9. In this illustrative example, the N samples were divided uniformly into M groups where each is composed of 3 samples. The number of samples in each group depends on the number of labels wanted and the number of samples from the radiometer. For example, if the radiometer measures N=90 samples/pixel and the pixels shall have a maximum of 5 labels, then the number of groups M will be 5 and there will be 18 samples in each group. Note that instead of grouping the computed distances, it is also possible as an equivalent solution to group the samples according to their order of appearance and then compute the distances using the groups.

It should be noted, however, that any algorithm that groups the samples of the pixel is possible to use and can present an alternative embodiment to group the samples in the present invention. Grouping of the samples can be done for example using clustering algorithms like K-means. The latter will cluster the samples of each pixel into M different groups where each in this case belongs to one of the K-means clusters.

Whatever grouping methodology is used, the result of this step is a grouped SSI (GSSI) 7' in which the optimization of equation (6) should be performed to find the optimal labels. These labels correspond to the possible solutions that each pixel can have in the reconstructed radiometric image 6. If no grouping is performed, the GSSI 7' is equal to the SSI 7 and the number of groups is equal to the number of the samples for each pixel, i.e. M=N. Otherwise, the number of groups will be M such that 0<M<N.

The right term of equation (6) expresses the interaction between the neighboring pixels. This means that the role of this term is mainly to enforce the properties of the radiometric surface on the reconstructed image. Therefore, it is necessary that the term $\psi(L, L_i)$ be chosen according to the properties that are to be enforced on the image to be reconstructed. In general, this term should allow the reconstructed radiometric image to vary smoothly except when there are edges where there are some jumps. Preferably, the term $\psi(L, L_i)$ should be proportional to the difference between the label of each pixel and that of its neighbors. One way to express this mathematically is by writing $\psi$ in the form $$\psi(L, L_i) = \phi(|L-L_i|^l) \quad (7)$$

The form of the term $\psi(L, L_i)$ presented in equation (7) is the general way to express the interaction among the neighboring pixels according to this invention. These follow the same concept that was applied to equation (3) in the distance calculator. In other words, it is possible to take the Potts energy model which assigns two values for the differences between the labels depending if $|L-L_i|^l$ is below or above a certain threshold Q. Another alternative embodiment is to assign three values $|L-L_i|^l$ depending on two threshold values $Q_1$ and $Q_2$, where $Q_1 \le Q_2$. $|L-L_i|^l$ will lead in this case to a cost value $J_1$ if its value is less than $Q_1$, $|L-L_i|^l$ will lead to a cost value $J_2$ if its value is between $Q_1$ and $Q_2$. $|L-L_i|^l$ will lead to a cost value $J_3$ if its value is larger than $Q_2$. More details on these variations can be found in C. Leung, "Efficient methods for 3D reconstruction from multiple image", Chapter 4, pp. 80-134, PhD thesis, University of Queensland, February 2006.

As one preferred embodiment of the invention, the term $\psi(L, L_i)$ can be defined while respecting equation (7) as follows $$\psi(L, L_i) = \min(|L-L_i|, \tau) \quad (8)$$

In this way, the label difference follows a linear model. It increases up to a threshold $\tau$ after which it becomes constant. Therefore, the preferred embodiment of equation (6) that shall be optimized according to this invention is $$E(\Delta) = \sum_{x,y} C(x, y, L) + \lambda \sum_{x,y} \sum_{x_i,y_i} \min(|L - L_i|, \tau). \quad (9)$$

The values of $\lambda$ and $\tau$ that should be used depend on the optimization algorithm used. But in general, these two terms are positive real numbers. The solution or configuration $\Delta$ associated with the extremum of the energy, i.e. where $E(\Delta)$ is a global extremum, will be the reconstructed radiometric image according to the present invention. But it should be noted that the global extremum depends on the optimization algorithm.

The aim of the optimization algorithm in the present invention is to find the global optimum of equation (6) that corresponds to the radiometric image. Therefore, the aim of the optimization according to the invention is to try to determine the optimal label L for each pixel from the GSSI such that $0 \le L \le M$ while satisfying equation (6). The optimization can be performed according to this invention in three ways: local, scanline and global. The choice among the three optimization schemes depends on the computational power available and the minimum required quality of the radiometric images. The different embodiments will be explained in the following.

The local optimization is the simplest way to calculate the radiometric image according to equation (6). Substantially, it comprises the step of taking the extremum value, i.e. minimum or maximum functions, of the cost defined by equation (6) at each pixel. This can be expressed mathematically in this case as $$E(\Delta) = C(x, y, L) + \lambda \sum_{x_i,y_i} \psi(L, L_i) \quad (10)$$

In other words, the energy function $E(\Delta)$ is calculated for each pixel separately and the optimal label L for each pixel will be the one that corresponds to $E(\Delta)$ being an extremum. This can be calculated by computing the energy function for each label using equation (10) and finding the one that corresponds to the extremum. In case the costs in equations (2) and (3) are used along with the interaction in equation (8), the optimal label will correspond to the label that results in the minimum value of $E(\Delta)$ in equation (10).

Many variations of the local optimization exist. Generally, according to local optimization an energy function is used including a second summand taking account of the costs of at least one radiation sample or group of radiation samples of all directly neighboring data sub-sets.

Figure 10:
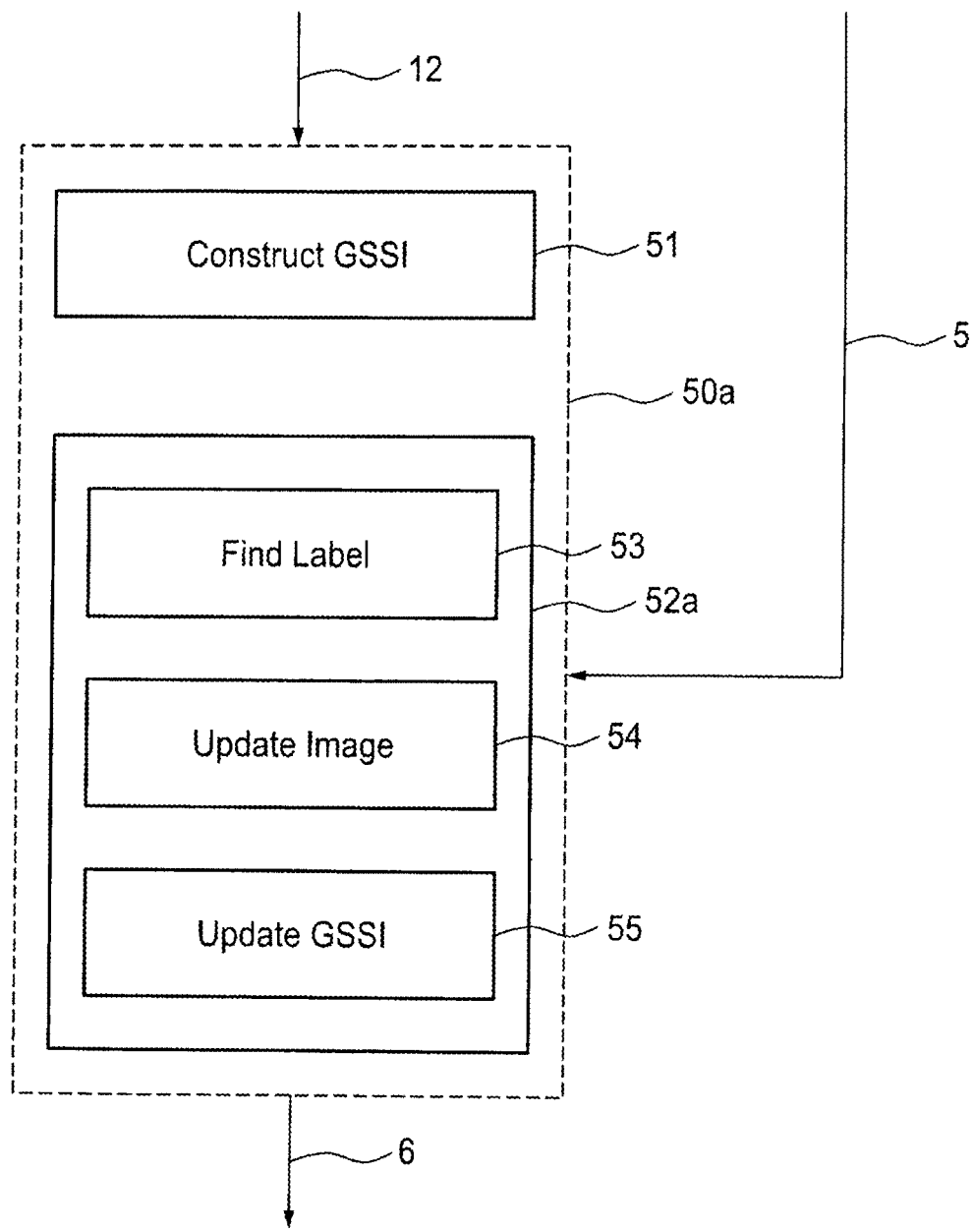
FIG. 10 shows first embodiment of an optimization unit according to the present invention using local optimization.

A preferred embodiment of an optimization unit 50a for performing local optimization is schematically shown in FIG. 10. First, in a GSSI construction unit 51 a GSSI is constructed from the SSI. Thereafter in an iteration unit 52a for each pixel in the GSSI the following steps are carried out. In a label finding unit 53 the label of the GSSI corresponding to the extremum of equation (10) is found. Then, in an image update unit 54 the constructed image is updated with the found label. In addition, in a GSSI update unit 55 the GSSI is updated with the found label if necessary.

The advantage of the local optimization is that it can be done usually very fast. To improve the quality of the reconstructed images in local optimization, it is preferred according to a further embodiment that the patch selection unit 32 chooses some patches in the SSI around each pixel to be reconstructed before calculating the costs. In still another embodiment the patch selection unit 32 is incorporated with an algorithm that calculates the optimal patch or segment around each pixel before calculating the costs.

Scanline optimization proposed according to further embodiments means optimizing equation (6) in each scanline of the GSSI. Looking at FIG. 8, this means that the optimization is done separately either for each row or for each column in the GSSI. Scanline optimization is similar to the local optimization since it splits the optimization of equation (6) in the GSSI into several smaller optimization problems. The split is done here, however, for each scanline of the image and not for each pixel. Scanline optimization can be formulated mathematically according to this invention as follows $$E(\Delta) = \sum_{(x,y) \in SL} C(x, y, L) + \lambda \sum_{(x,y) \in SL} \sum_{x_i, y_i} \psi(L, L_i). \quad (11)$$

SL denotes in equation (11) the scanline. Scanline optimization splits the optimization of equation (6) over all the GSSI into an optimization over line-slices of the GSSI. This means that the optimization is done for each scanline and consequently, the optimal label for each pixel in the reconstructed radiometric image will be dependent on the other pixels of the scanline where the pixel belongs. This illustrates the difference to the local optimization where the result only depends on the pixel itself.

Many variations of the scanline optimization exist. Generally, according to scanline optimization an energy function is used including a second summand taking account of the costs of at least one radiation sample or group of radiation samples of all neighboring data sub-sets of the same row or column.

Figure 11:
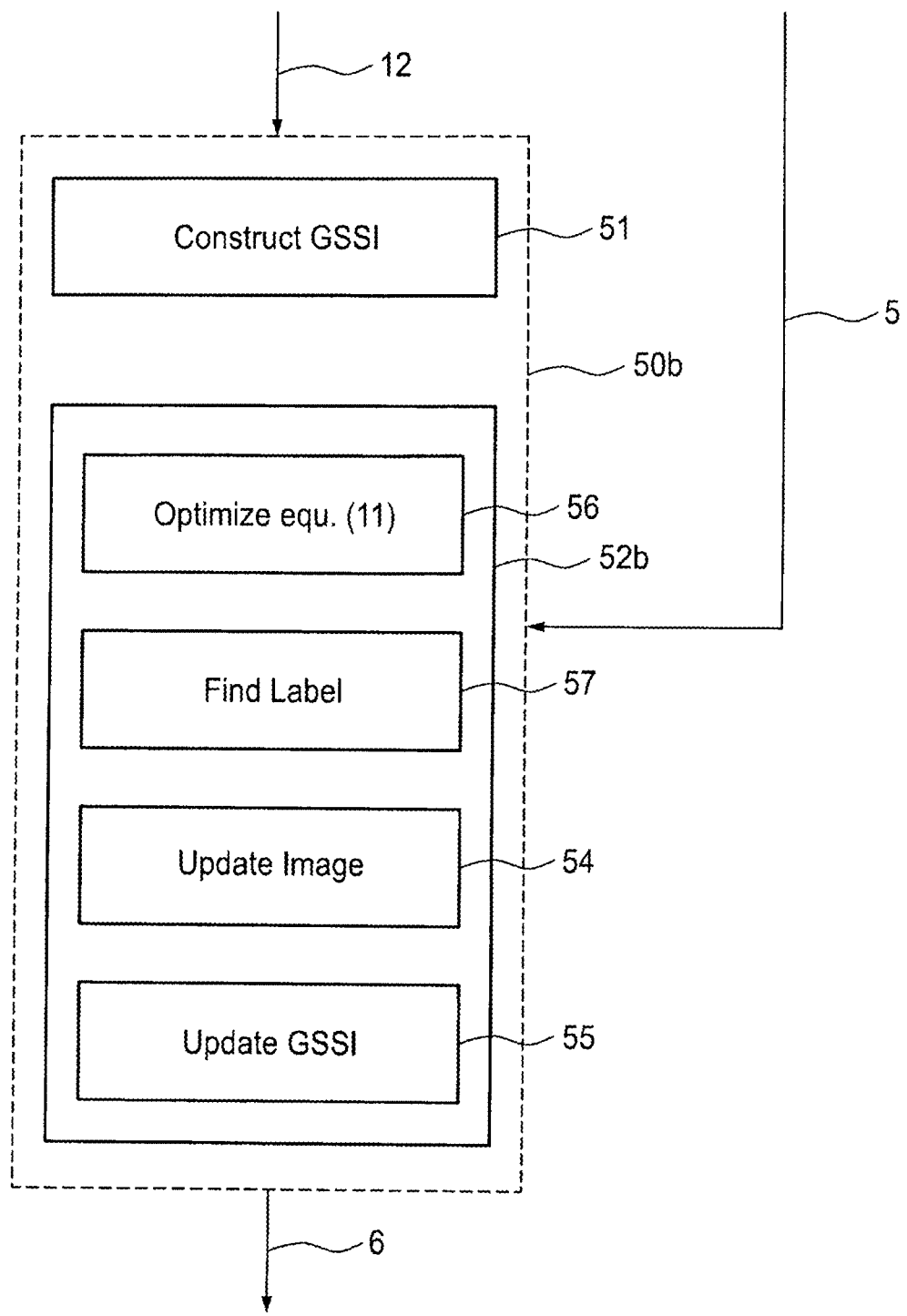
FIG. 11 shows second embodiment of an optimization unit according to the present invention using scanline optimization.

A preferred embodiment of a scanline optimization unit 50b for performing scanline optimization is schematically shown in FIG. 11. First, in a GSSI construction unit 51 a GSSI is constructed from the SSI. Thereafter in an iteration unit 52b for each scanline slice in the GSSI the following steps are carried out. In an equation optimization unit 56 the equation (11) is optimized. In a label finding unit 57 the labels for each pixel in the line-slice that correspond to the extremum of equation (11) according to the optimization are found. Then, in an image update unit 54 the constructed image is updated with the found labels. In addition, in a GSSI update unit 55 the GSSI is updated with the found labels if necessary.

In a preferred embodiment of the optimization according to the present invention the dynamic programming (DP) concept is used. DP in terms of this invention tries to find the optimal path where the cost defined by equation (11) is an extremum. In case the costs in equations (2) and (3) are used along with the interaction in equation (8), the optimal path according to DP corresponds to the minimum-cost path or to the value of $E(\Delta)$ in equation (11) when it is at a minimum. From the minimum path, the label of each pixel in the scanline that are optimal according to DP are extracted. This process is repeated until all the scanline slices in the GSSI are processed. More information about DP can be found in Y. Ohta and T. Kanade, "Stereo by intra- and inter scanline search using dynamic programming", IEEE Transactions on pattern analysis and machine intelligence, vol. 7, 1985 for example. In terms of this invention, DP optimization is composed of two steps. The first one is a forward accumulation stage which builds up a cost volume for each scanline using the costs derived previously for the labels. For that, a matrix M is inititated to 0. Then for each scanline, it is filled with the costs defined in equation (11) as such $$M(x, y, L) = C(x, y, L) + \min(C(x-1, y, L-1) + \lambda, C(x-1, y, L), C(x, y, L+1)) \quad (11a)$$

After filling M with the costs as defined in equation (11a), a backward tracing step follows to extract the optimal label path for each scanline corresponding to where the energy $E(\Delta)$ in equation (11) is an extremum. This step is repeated for every scanline and the resulting labels computed optimally for a scanline will be the reconstructed radiometric image once they are stacked together.

It shall be noted that DP is a preferred embodiment of scanline optimization for reconstructing the radiometric image, but other embodiments with scanline optimization exist, which can be applied as an alternative to DP. For example, it is possible to use any variant of a convex optimization like Newton as described in S. Boyd and L. Vandenberghe, "Convex Optimization", Cambridge University Press, 2009 or any energy optimization method like graph cuts or belief propagation shown in J. Yedidia, W. T. Freeman and Y. Weiss, "Understanding Belief Propagation and its Generalizations", Technical Report-2001-22, Mitsubishi Electric Research Laboratories, January 2002 defined on a single scanline of the image as alternative embodiments to DP.

Scanline optimization is slower than local optimization, but leads to better quality radiometric images. To obtain radiometric images with even better qualities in scanline optimization, the same improvements that were explained above for local optimization can be applied.

Global optimization proposed according to further embodiments means optimizing equation (6) over the whole GSSI at the same time. Different from local or scanline optimization, global optimization does not split the optimization problem into several smaller ones. The optimal label for each pixel in the reconstructed image will therefore be dependent on all the other pixels. This can be expressed mathematically as follows $$E(\Delta) = \sum_{(x,y) \in GSSI} C(x, y, L) + \lambda \sum_{(x,y) \in GSSI} \sum_{x_i, y_i} \psi(L, L_i). \quad (12)$$

To reconstruct the radiometric image using a global optimization concept, it is necessary to optimize equation (12) over the whole GSSI. Good candidates for doing that are similar to what can applied for the scanline optimization, i.e. any convex or energy optimization method but defined over the whole GSSI and not a scanline slice. Many example algorithms are available in the art and some are shown in C. Leung, "Efficient methods for 3D reconstruction from multiple image", Chapter 4, pp. 80-134, PhD thesis, University of Queensland, February 2006 and S. Boyd and L. Vandenberghe, "Convex Optimization", Cambridge University Press, 2009.

Many variations of the global optimization exist. Generally, according to global optimization an energy function is used including a second summand taking account of the costs of at least one radiation sample or group of radiation samples of data sub-sets from different rows and/or column, in particular from of all data sub-sets.

Figure 12:
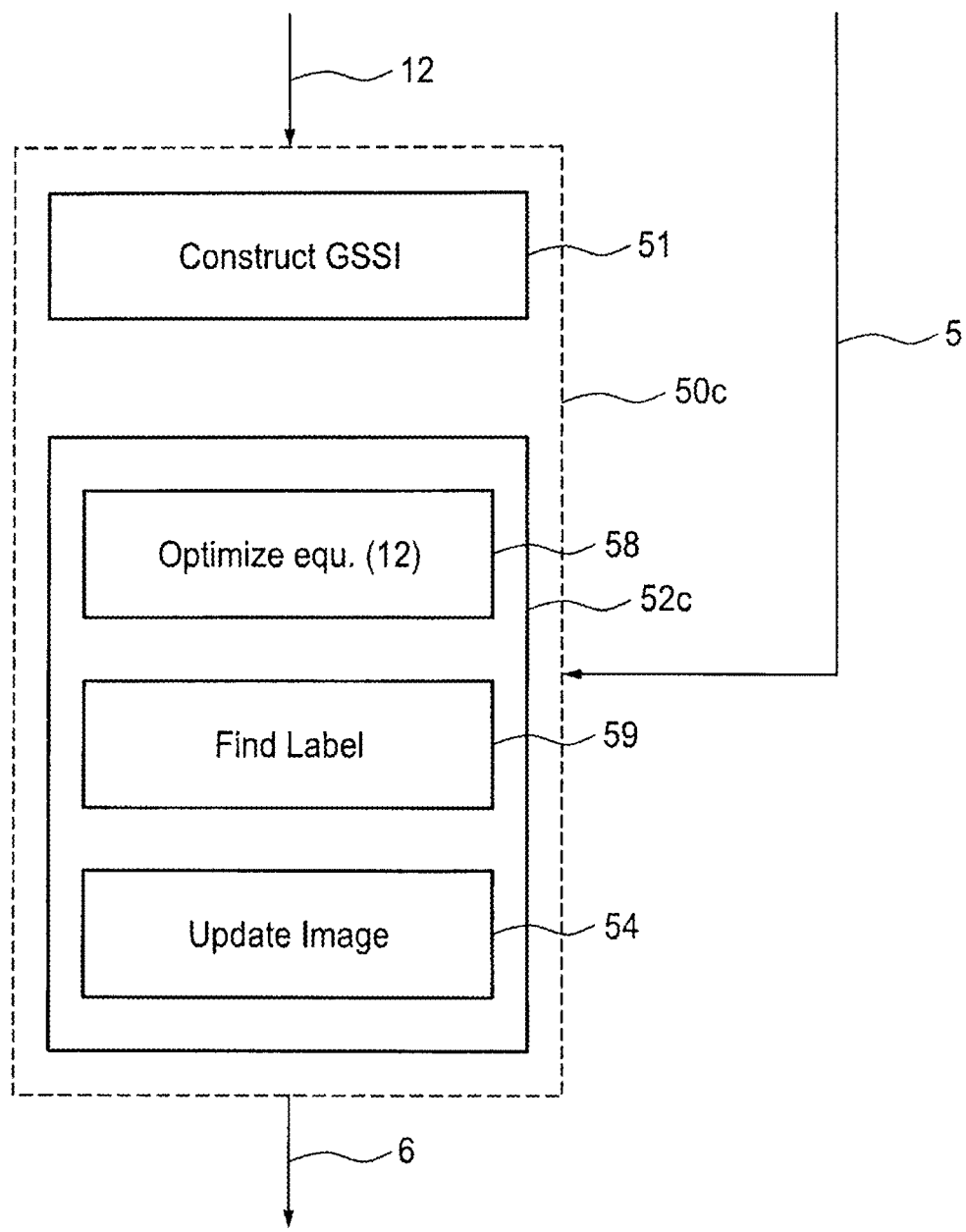
FIG. 12 shows third embodiment of an optimization unit according to the present invention using global optimization.

A preferred embodiment of a global optimization unit 50c for performing global optimization is schematically shown in FIG. 12. First, in a GSSI construction unit 51 a GSSI is constructed from the SSI. Thereafter in an iteration unit 52c for the whole GSSI the following steps are carried out. In an equation optimization unit 58 the equation (12) is optimized. In a label finding unit 59 the labels for each pixel in the GSSI that correspond to the extremum of equation (12) according to the optimization are found. Then, in an image update unit 54 the constructed image is updated with the found labels.

Irrespective of which embodiment used, global optimization results in improved reconstructed radiometric images compared to local or scanline optimization, but has a larger computational complexity. When performing such an optimization, it is also possible that the patch selection unit 32 chooses some patches in the SSI before calculating the costs. This is, however, not necessary here opposed to local or scanline optimization (where this is preferred) since the global optimization will consider the effect of all the other pixels when reconstructing the image. Therefore, it is usually sufficient that the costs are calculated using only the samples of the pixel themselves when using a global optimization strategy to reconstruct the radiometric image.

Another preferred embodiment of a global optimization unit 50d for performing global optimization with belief propagation (BP) is schematically shown in FIG. 12. BP is a message passing algorithm. It performs the optimization of equation (12) by performing an inference on the Markov Random fields, i.e. a graphical model, formed by calculating the marginal distribution of the nodes of a graph. The nodes of the graph are the pixels of the radiometric image to be reconstructed. In terms of the present invention, BP is an iterative algorithm that operates on a connected grid. This means that BP passes at each iteration "t" a message from one node to at least one of its neighboring nodes in the connected grid. The connected grid can be as simple as the checkerboard scheme, i.e. the left, right, up and down nodes affect the current node or any other connectivity applied in BP.

Irrespective of the connectivity assumed on the grid, let p and q be two neighboring nodes in the graph. In order to be consistent with equation (12), let p have the coordinates ($x_p$, $y_p$) in the GSSI and a possible label $L_p$ and let q have the coordinates ($x_q$, $y_q$) in the GSSI and a possible label $L_q$. The message $m^t_{p \Rightarrow q}$ that has to be passed according to this embodiment from node p to node q at iteration t and using equation (12) has the form $$m^t_{p \Rightarrow q}(L_p) = \min_p \left( C(x_p, y_p, L_p) + \lambda \psi(L_p, L_q) + \sum_{g \in G(p), g \neq q} m^{t-1}_{g \Rightarrow p}(L_p) \right) \quad (13)$$

where G(p) denotes the neighbors of p in the connected graph and the term g∈G(p)g≠q denotes all the neighbors of node p in the graph to the exception of q. The messages are initialized with 0 at the first iteration. After T iterations, a belief vector will be computed at each node or pixel in the graph which has the form $$V(L_q) = C(x_q, y_q, L_q) + \sum_{p \in G(q)} m^T_{p \Rightarrow q}(L_q) \quad (14)$$

Figure 13:
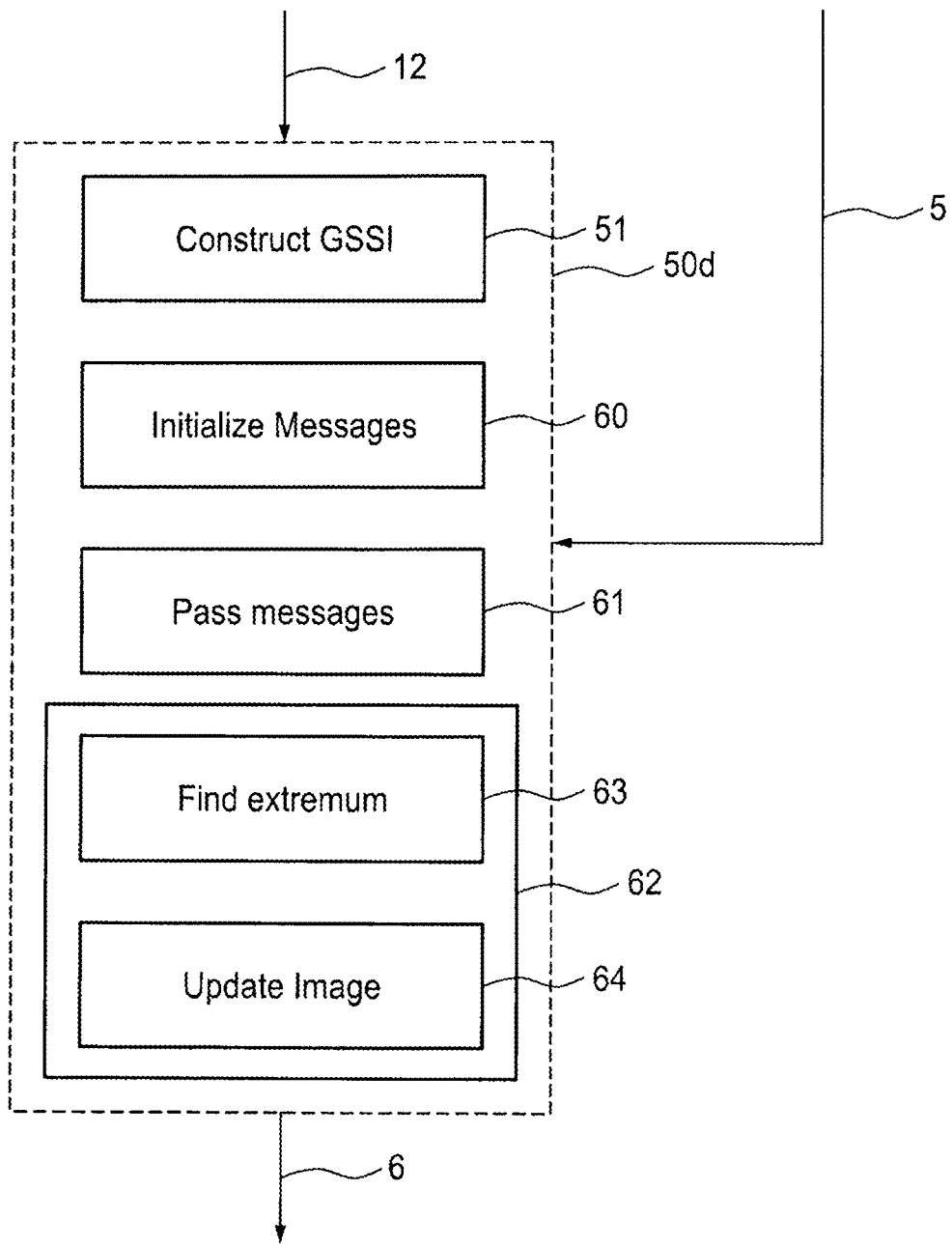
FIG. 13 shows fourth embodiment of an optimization unit according to the present invention using belief propagation for global optimization.

The dimension of this vector is the number of all the possible labels M in the GSSI. Consequently, the label $L_q$ that optimizes individually $V(L_q)$ at each node (or pixel), i.e. extremum of $V(L_q)$, is the optimal label that has to be chosen for each pixel in the reconstructed radiometric image. In addition, this label is the globally optimal label for the pixel that satisfies equation (12) in terms of BP used according to this embodiment for which an optimization unit 50d is depicted in FIG. 13.

This optimization unit 50d comprises a GSSI construction unit 51 in which a GSSI is constructed from the SSI. Thereafter, in a message initialization unit the belief propagation messages are initialized to zero. For iteration 1=T, in a message passing unit 61 for every node and for every possible label every message is passed from each node to its neighbors according to equation (13). In an iteration unit 62 for every node the following steps are performed. In all extremum finding unit 63 the extremum of the belief vector at each node is found according to equation (14). Then, in an image update unit 64 the constructed image is updated with the found labels of the extremum.

It shall be noted that the present embodiment of BP is not the only variation that can be used for optimization. There many variations of the BP concept in the state of the art, for instance as described in J. Yedidia, W. T. Freeman and Y. Weiss, "Understanding Belief Propagation and its Generalizations", Technical Report-2001-22, Mitsubishi Electric Research Laboratories, January 2002. Further, the presented embodiment can be easily exported to other optimization algorithms that solve the inference problem. One example is closely related to BP is Graph Cuts as described e.g. in Y. Boykov, O. Veksler and R. Zabih, "Fast approximate energy minimization via graph cuts", IEEE Transactions on Pattern Analysis and Machine Intelligence, pp. 1222-1239, November 2001.

As a result, the optimization algorithms that solve the inference problem, e.g. BP and graph cuts, and all the other convex or energy optimization algorithms, are alternative embodiments to global optimization. Any of these can generally be used to reconstruct the radiometric image according to the present invention. These can also be formulated as a scanline optimization or as a global optimization as described above to reconstruct a radiometric image while not deviating from the general principle of the invention.

Figure 14:
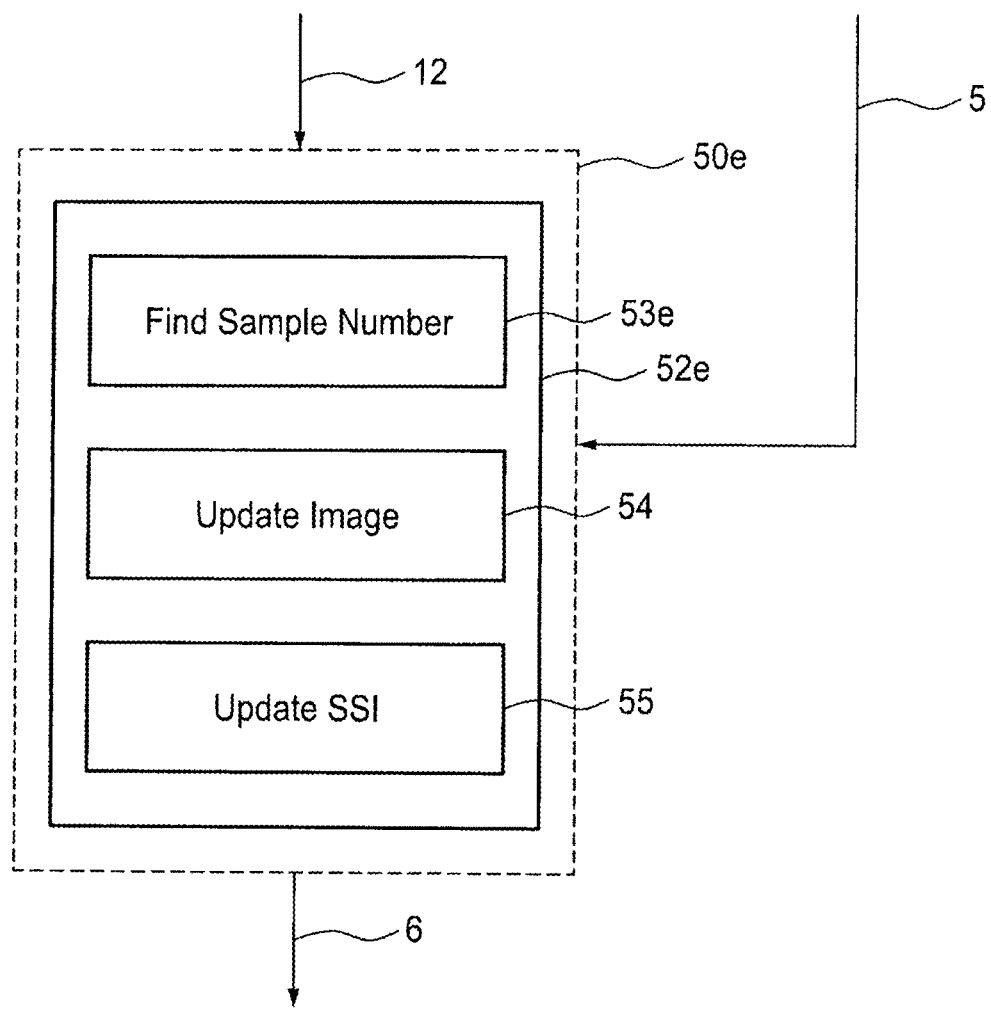
FIG. 14 shows fifth embodiment of an optimization unit according to the present invention using local optimization.

In the above, embodiments of the optimization unit have been described which are based on finding for each pixel the optimum label. For this purpose the samples of the SSI are grouped into a GSSI as explained above. In other embodiments, however, no grouping of samples is made, but the number of each sample in the SSI is directly used as a label and the optimum label (i.e. sample number) is searched for each pixel. An embodiment of such an optimization unit 50e is depicted in FIG. 14 using local optimization. In an iteration unit 52e for each pixel in the SSI the following steps are carried out. In a sample finding unit 53e the sample number of the SSI corresponding to the extremum of equation (10) is found. Then, in an image update unit 54 the constructed image is updated with the found sample and in an SSI update unit 55c. In addition, the SSI is updated with the found sample if necessary. A similar modification can be also applied on the scanline and global optimization algorithms, which can be easily done by the skilled person.

Figure 15:
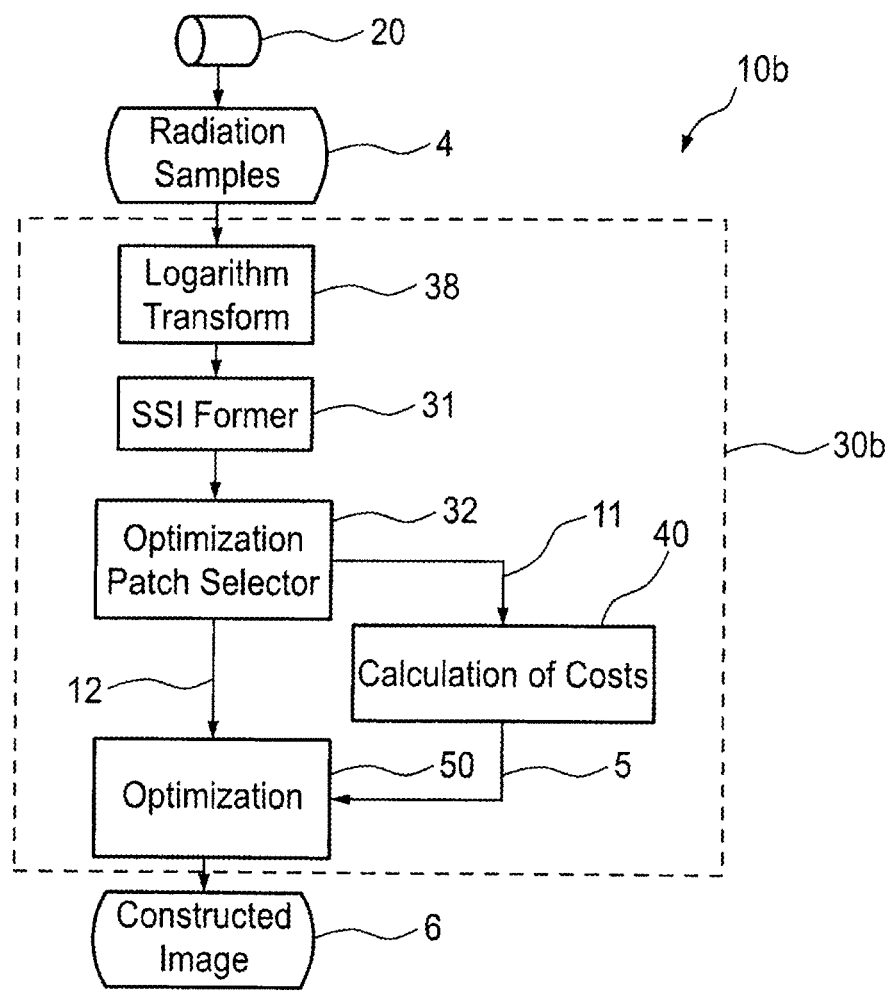
FIG. 15 shows a third embodiment of a passive radiometric imaging device according to the present invention.

The radiometric samples are in general noisy samples due to many internal and external factors and due to the weakness of the passive radiometric waves themselves. In addition, there might be other deteriorating factors like the blurring of the antenna of the radiometer for example. The presented invention can be easily coped with these distortions by taking further additional measures. If the noise under consideration has a multiplicative form, the radiation samples can be transformed with a logarithmic transform before the computations starts. An embodiment of such an imaging device 10 is depicted in FIG. 15. In this embodiment the processing unit 30b comprising a logarithm transform unit 38 dealing with the multiplicative noise. Depending on the type of distortion under consideration and the compensation algorithm used other embodiments are also possible.

FIG. 16 shows the effect of the present invention by depicting images reconstructed using the invention and using conventional methods from the samples captured by a passive electromagnetic radiometer. Two images of a person were reconstructed with each method, in particular one image (shown in the top row) with a hidden gun and another image (shown in the bottom row) with a hidden metal plate. The samples of the radiometer were first standardized. Then, the SSI was reconstructed with a size of 200×200×256 corresponding respectively to the width of the image, the height of the image and the number of samples per pixel.

The patch selector unit was set for one pixel only and hence the costs were computed using only the samples of each pixel in the SSI with equation (3). The SSI was grouped via uniform grouping to construct a GSSI which has 5 groups. The preferred embodiment of the invention with BP shown in FIG. 13 was used to construct the radiometric image, i.e. find the optimal label of each pixel from the 5 available labels in the GSSI. For that, BP was used to optimize the preferred embodiment of the cost function shown in equation (9). The resulting constructed images have a size of 200×200 pixels. The noise was assumed to be multiplicative and for that the preferred embodiment of the invention for multiplicative noise shown in FIG. 15. The truncation value c used in equation (2) was set to 5 and the constants $\lambda$ and $\tau$ in equation (9) were set to 1 and 0.8 respectively.

Figures 16A, 16B:
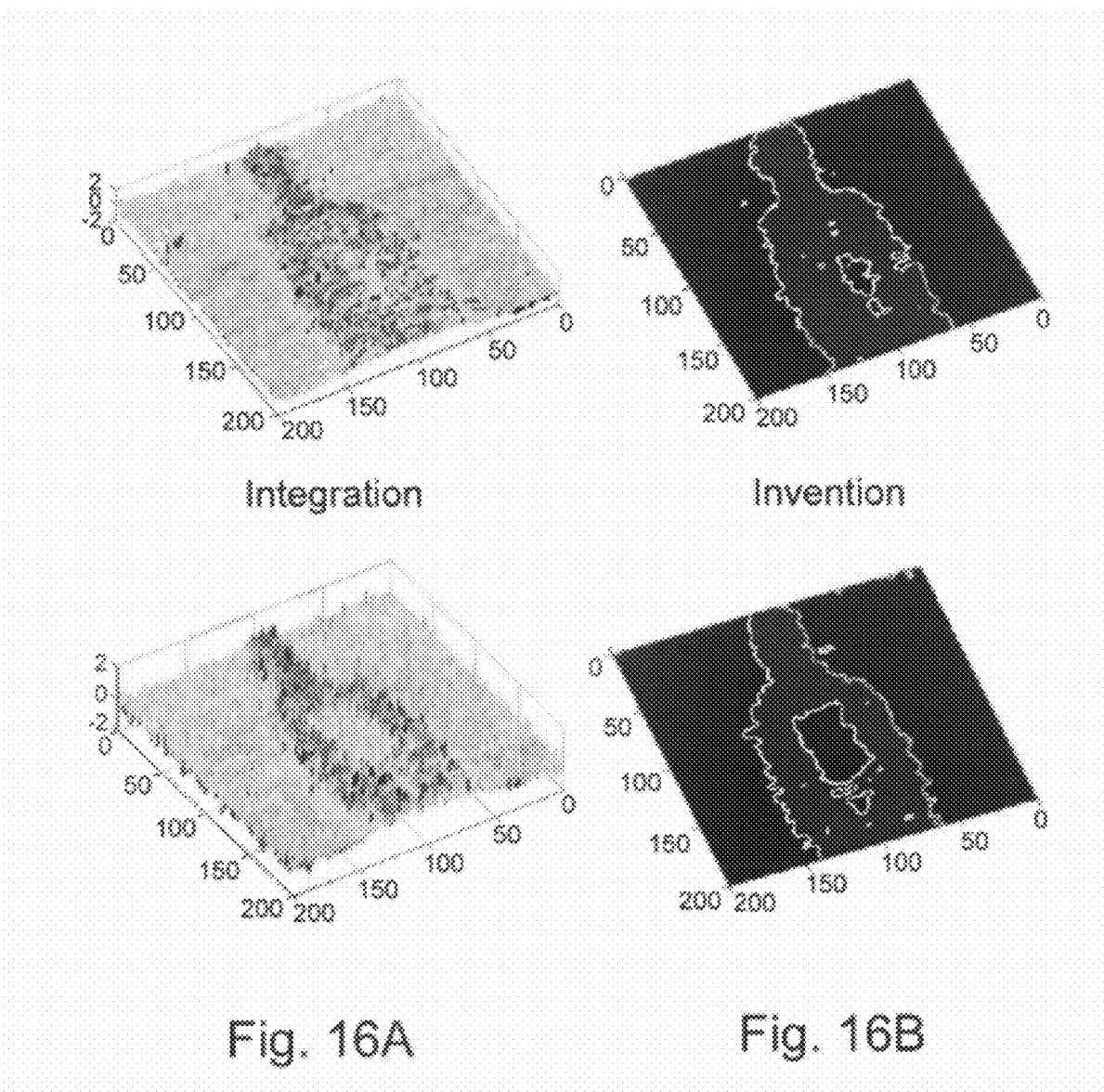
FIG. 16 shows images obtained with the present invention compared to images obtained by known methods.
Figure 16C:
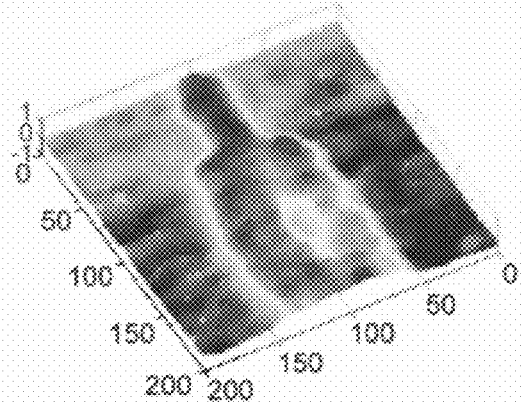
Figure 16C:
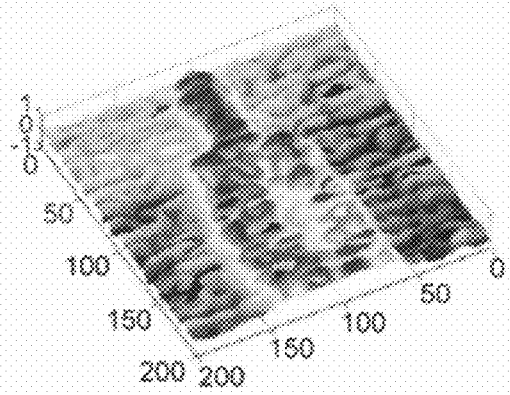
Figure 16C:
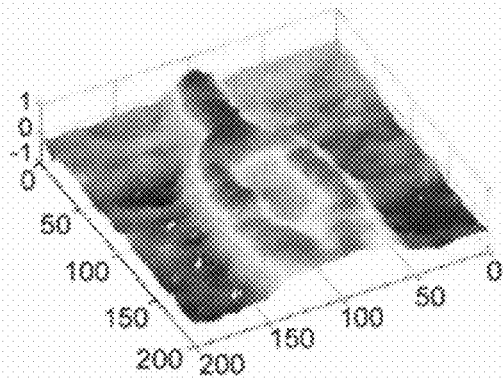
Figure 16D:
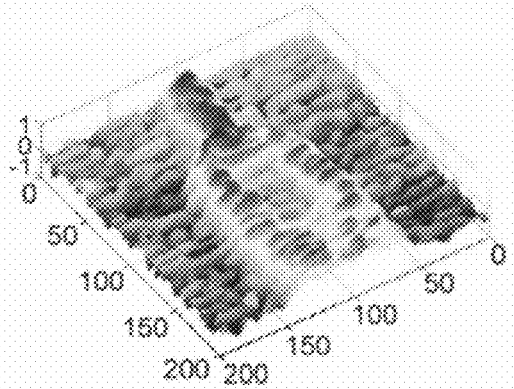

FIG. 16A shows the result of integration over SSI using the whole 256 samples as done according to a known method, FIG. 16B shows the result of the method according to the present invention, FIG. 16C shows the results of integration and then a bilateral filtering scheme (as described in S. Paris and F. Durand, "A Fast Approximation of the Bilateral Filter using a Signal Processing Approach", in European Conference on Computer Vision, pp. 568-580, May 2006), and FIG. 16D shows the results of integration and then an anisotropic diffusion of scheme (as described in J. Weickert and H. Scharr, "A scheme for coherence-enhancing diffusion filtering with optimized rotation invariance," J. Visual Communication and Image Representation, pp. 103-118, March 2002). From these images it can directly be seen that the outcome of the invention has much more contrast, much less noise and the shapes of the objects are much more preserved and less varying than by using the other algorithms. This allows a better post-analysis of the radiometric image for various applications.

It shall be noted that other combinations of the elements described in the above embodiments are also possible according to the present invention. For instance, in the embodiment disclosed in FIG. 1 the processing means may be adapted for weighing the radiation samples of a data sub-set according to their similarity and for determining the pixel value of the pixel from the weighted radiation samples. Further, in said embodiment a patch selection unit may be provided for defining said data sub-set of radiation samples. As mentioned above, the size of a patch can be predefined and fixed or can be variable, for instance, depending on the location of the pixel whose pixel value is determined by use of said patch. Preferably, the size and/or form of the patch is adapted to include the largest possible area of similar radiation samples around a spot corresponding to or being closest to the pixel especially when a local or scanline optimization algorithm is used to reconstruct the radiometric image.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A passive radiometric imaging device for scanning a scene and reconstructing an image of said scene, said device comprising:
   a radiometer configured to detect radiation emitted in a predetermined spectral range from a plurality of spots of said scene to obtain a data set of radiation samples including at least one radiation sample per spot, and
   a processor configured to subsequently determine pixel values of pixels of the image to be reconstructed, said processor being adapted to determine a pixel value of one of said pixels from a data sub-set of a plurality of radiation samples from said data set, said data sub-set including the plurality of radiation samples detected at a spot corresponding to the one of said pixels, whose pixel value is to be determined, said processor functioning as
   a cost calculation unit configured to calculate costs for the plurality of radiation samples of said data sub-set according to a cost function, said costs representing distances of the plurality of radiation samples of the data sub-set from at least one representative point determined within the data sub-set, and
   an optimization unit configured to determine a pixel value as a label value from a set of label values, a label indicating a radiation sample or a group of radiation samples of the data sub-set, by determining an extremum of energy values determined for different radiation samples or different groups of radiation samples of the data sub-set by using an energy function, said energy function forming a sum adding a first summand including the costs of the radiation sample or the group of radiation samples of the data sub-set, for which an energy value is determined, and a second summand taking account of other costs of at least one radiation sample or group of radiation samples of at least one neighboring data sub-set.

2. The passive radiometric imaging device as claimed in claim 1,
   wherein said optimization unit is configured to use the energy function including the second summand taking account of the other costs of at least one radiation sample or group of radiation samples of all directly neighboring data sub-sets.

3. The passive radiometric imaging device as claimed in claim 1,
   wherein said optimization unit is configured to use the energy function including the second summand taking account of the other costs of at least one radiation sample or group of radiation samples of all neighboring data sub-sets of a same row or column.

4. The passive radiometric imaging device as claimed in claim 1,
   wherein said optimization unit is configured to use the energy function including the second summand taking account of the other costs of at least one radiation sample or group of radiation samples of all data sub-sets from different rows or columns.

5. The passive radiometric imaging device as claimed in claim 3 or 4,
   wherein said optimization unit is configured to use the energy function taking the other costs of the neighboring data sub-sets or data sub-sets from different rows or columns as a function of difference between the label values.

6. The passive radiometric imaging device as claimed in claim 3 or 4,
wherein said optimization unit is configured to apply belief propagation for determining the label values for the pixels by determining the extremum of said energy values associated with the label values.

7. The passive radiometric imaging device as claimed in claim 3 or 4,
wherein said optimization unit is configured to apply dynamic programming for determining the label values for the pixels by determining the extremum of said energy values associated with the label values.

8. The passive radiometric imaging device as claimed in claim 1,
wherein said optimization unit is configured to assign said label to the radiation sample or the group of radiation samples of the data sub-set, said label identifying the radiation sample or the group of radiation samples, to assign cost values to labels and to determine energy values for the labels by use of said energy function, said energy function forming the sum adding the first summand including the costs of the label, for which the energy value is determined, and the second summand taking account of the other costs of at least one label of the at least one neighboring data sub-set.

9. The passive radiometric imaging device as claimed in claim 1, wherein said optimization unit is configured to assign a set of labels for each pixel as a number of the radiation sample within the data sub-set.

10. The passive radiometric imaging device as claimed in claim 1, wherein said optimization unit is configured to group the plurality of radiation samples, by uniform grouping, and to assign a set of labels as a number of the group within the data sub-set.

11. The passive radiometric imaging device as claimed in claim 1,
wherein said cost calculation unit is configured to use a distance function as the cost function, said cost calculation unit comprising:
a representative point estimation unit configured to determine said at least one representative point for the plurality of radiation samples of the data sub-set being representative for the plurality of radiation samples, and
a distance calculation unit configured to determine the distances of the plurality of radiation samples of the data sub-set from said at least one representative point, said distances representing said costs.

12. The passive radiometric imaging device as claimed in claim 11,
wherein said representative point estimation unit is adapted for determining said at least one representative point as the magnitude of a centroid, an average, a median or a magnitude of the median of the plurality of radiation samples of the data sub-set.

13. The passive radiometric imaging device as claimed in claim 11,
wherein said cost calculation unit further comprises a weighing factor calculation unit configured to determine weights for the plurality of radiation samples of said data sub-set based on the determined distances, wherein the plurality of radiation samples having a smaller distance obtain a higher weight than the plurality of radiation samples having a larger distance, said weights or distances weighted with corresponding weights representing said costs.

14. The passive radiometric imaging device as claimed in claim 1,
wherein said processor is configured to function as a patch selection unit for defining said data sub-set of the plurality of radiation samples from said data set, said patch selection unit being adapted for defining said data sub-set by using a window having a predetermined size or form around the spot corresponding to the plurality of radiation samples of the one of said pixels, whose pixel value is to be determined.

15. The passive radiometric imaging device as claimed in claim 1,
wherein said processor is configured to function as a patch selection unit for defining said data sub-set of the plurality of radiation samples from said data set, said patch selection unit being adapted for defining said data sub-set by using a window having variable size or form around the spot corresponding to the one of said pixels, wherein the size or form of the window is varied depending on location of the plurality of radiation samples of the one of said pixels, whose pixel value is to be determined.

16. The passive radiometric imaging device as claimed in claim 15,
wherein said patch selection unit is adapted for varying the size or form of the window so as to include a largest possible area of similar radiation samples around the spot corresponding to the plurality of radiation samples of the one of said pixels, whose pixel value is to be determined.

17. The passive radiometric imaging device as claimed in claim 1,
further comprising a logarithm transformer for taking a logarithm of the plurality of radiation samples before processing the plurality of radiation samples by a processing unit.

18. A passive radiometric imaging method for scanning a scene and reconstructing an image of said scene, said method comprising:
detecting, using a radiometer, radiation emitted in a predetermined spectral range from a plurality of spots of said scene to obtain a data set of radiation samples including at least one radiation sample per spot, and
subsequently determining pixel values of pixels of the image to be reconstructed, wherein a pixel value of one of said pixels from a data sub-set of a plurality of radiation samples is determined from said data set, said data sub-set including the plurality of radiation samples detected at a spot corresponding to the one of said pixels, whose pixel value is to be determined, said determining pixel values comprising
calculating costs for the plurality of radiation samples of said data sub-set according to a cost function, said costs representing distances of the plurality of radiation samples of the data sub-set from at least one representative point determined within the data sub-set, and
determining a pixel value as a label value from a set of label values, a label indicating a radiation sample or a group of radiation samples of the data sub-set, by determining an extremum of energy values determined for different radiation samples or different groups of radiation samples of the data sub-set by using an energy function, said energy function forming a sum adding a first summand including the costs of the radiation sample or the group of radiation samples of the data sub-set, for which an energy value is determined, and a second summand taking account of other costs of at least one radiation sample or group of radiation samples of at least one neighboring data sub-set.

19. A processing apparatus for use in a passive radiometric imaging device for scanning a scene and reconstructing an image of said scene, said imaging device comprising a radiometer configured to detect radiation emitted in a predetermined spectral range from a plurality of spots of said scene to obtain a data set of radiation samples including at least one radiation sample per spot, said processing apparatus being configured to subsequently determine pixel values of pixels of the image to be reconstructed, said processing apparatus being adapted to determine a pixel value of one of said pixels from a data sub-set of a plurality of radiation samples from said data set, said data sub-set including the plurality of radiation samples detected at a spot corresponding to the one of said pixels, whose pixel value is to be determined, said processing apparatus functioning as:

a cost calculation unit configured to calculate costs for the plurality of radiation samples of said data sub-set according to a cost function, said costs representing distances of the plurality of radiation samples of the data sub-set from at least one representative point determined within the data sub-set, and an optimization unit configured to determine a pixel value as a label value from a set of label values, a label indicating a radiation sample or a group of radiation samples of the data sub-set, by determining an extremum of energy values determined for different radiation samples or different groups of radiation samples of the data sub-set by using an energy function, said energy function forming a sum adding a first summand including the costs of the radiation sample or the group of radiation samples of the data sub-set, for which an energy value is determined, and a second summand taking account of other costs of at least one radiation sample or group of radiation samples of at least one neighboring data sub-set.

20. A processing method for use in a passive radiometric imaging method for scanning a scene and reconstructing an image of said scene, said passive radiometric imaging method comprising detecting radiation emitted in a predetermined spectral range from a plurality of spots of said scene to obtain a data set of radiation samples including at least one radiation sample per spot, said processing method being configured to subsequently determine pixel values of pixels of the image to be reconstructed, wherein a pixel value of one of said pixels from a data sub-set of a plurality of radiation samples is determined from said data set, said data sub-set including the plurality of radiation samples detected at a spot corresponding to the one of said pixels, whose pixel value is to be determined, said processing method comprising calculating costs for the plurality of radiation samples of said data sub-set according to a cost function, said costs representing distances of the plurality of radiation samples of the data sub-set from at least one representative point determined within the data sub-set, and determining a pixel value as a label value from a set of label values, a label indicating a radiation sample or a group of radiation samples of the data sub-set, by determining an extremum of energy values determined for different radiation samples or different groups of radiation samples of the data sub-set by using an energy function, said energy function forming a sum adding a first summand including the costs of the radiation sample or the group of radiation samples of the data sub-set, for which an energy value is determined, and a second summand taking account of other costs of at least one radiation sample or group of radiation samples of at least one neighboring data sub-set.

21. A computer readable non-transitory medium having instructions stored thereon which, when carried out on a computer, cause the computer to perform the processing method as claimed in claim 20.

* * * * *